United States Patent
Fay, II et al.

(10) Patent No.: US 10,827,677 B2
(45) Date of Patent: Nov. 10, 2020

(54) DRAPER HEADER FOR HARVESTER PROVIDING FLOATATION TO GAUGE WHEELS

(71) Applicant: CNH Industrial America, LLC, New Holland, PA (US)

(72) Inventors: Jeffrey B. Fay, II, Oxford, PA (US); Ryan M. Figgins, New Holland, PA (US)

(73) Assignee: CNH Industrial America, LLC, New Holland, PA (US)

( * ) Notice: Subject to any disclaimer, the term of this patent is extended or adjusted under 35 U.S.C. 154(b) by 87 days.

(21) Appl. No.: 15/861,796

(22) Filed: Jan. 4, 2018

(65) Prior Publication Data

US 2019/0200523 A1    Jul. 4, 2019

(51) Int. Cl.
A01D 41/14    (2006.01)

(52) U.S. Cl.
CPC ......... *A01D 41/145* (2013.01); *A01D 41/141* (2013.01)

(58) Field of Classification Search
CPC .... A01D 41/145; A01D 41/141; A01B 63/16; A01B 63/002; A01B 63/22; A01B 73/00; A01B 73/005
See application file for complete search history.

(56) References Cited

U.S. PATENT DOCUMENTS

| | | | | |
|---|---|---|---|---|
| 4,435,948 A | * | 3/1984 | Jennings | A01B 73/005 56/192 |
| 4,552,375 A | * | 11/1985 | Kinzenbaw | A01B 73/005 172/248 |
| 4,558,560 A | * | 12/1985 | Koch | A01B 73/005 56/192 |
| 4,871,028 A | * | 10/1989 | Murray | A01B 73/005 172/248 |
| 4,991,383 A | * | 2/1991 | Ermarcora | A01D 67/00 56/14.5 |
| 5,136,828 A | * | 8/1992 | Ermacora | A01B 63/00 280/43.23 |
| 6,189,306 B1 | * | 2/2001 | Walch | A01D 67/005 56/15.1 |

(Continued)

FOREIGN PATENT DOCUMENTS

| | | |
|---|---|---|
| EP | 1721507 A1 | 11/2006 |
| EP | 2156725 A2 | 2/2010 |
| EP | 2420126 | 11/2013 |

OTHER PUBLICATIONS

International Search Report and Written Opinion for International Application No. PCT/US2019/012361 dated May 7, 2019 (11 pages).

*Primary Examiner* — Arpad Fabian-Kovacs
(74) *Attorney, Agent, or Firm* — Peter Zacharias; Patrick Sheldrake

(57) ABSTRACT

A draper header for a harvester useful for providing hydraulic lifting and lowering of ground wheels. Hydraulic cylinders are capable of being actuated to independently lower and raise the ground wheels of the header while using the floatation pressure from the lift cylinders of the harvester. First and second hydraulic cylinders are fluidically coupled to a charge pressure of the harvester, the charge pressure providing a floatation pressure to position first and second ground wheels at a lowered operation mode and a raised operation mode.

18 Claims, 23 Drawing Sheets

(56) References Cited

U.S. PATENT DOCUMENTS

| | | | | |
|---|---|---|---|---|
| 6,260,629 B1* | 7/2001 | Toth | ............... | A01B 73/005 |
| | | | | 172/278 |
| 6,273,449 B1* | 8/2001 | Harkcom | ............ | A01B 73/005 |
| | | | | 280/463 |
| 6,789,379 B2 | 9/2004 | Heidjann et al. | | |
| 6,907,719 B2* | 6/2005 | Ligouy | ............ | A01B 73/005 |
| | | | | 56/15.1 |
| 7,661,251 B1 | 2/2010 | Sloan et al. | | |
| 7,926,249 B1* | 4/2011 | Cook | ............ | A01B 73/005 |
| | | | | 172/240 |
| 7,971,420 B1 | 7/2011 | Bollin | | |
| 8,292,328 B2* | 10/2012 | Honas | ............ | A01D 75/002 |
| | | | | 280/769 |
| 8,646,543 B2* | 2/2014 | Yuen | ............ | A01B 73/02 |
| | | | | 172/311 |
| 8,943,788 B2* | 2/2015 | Miller | ............ | A01D 33/14 |
| | | | | 171/139 |
| 9,526,204 B2* | 12/2016 | Rude | ............ | A01D 34/00 |
| 9,565,800 B2* | 2/2017 | Fay, II | ............ | A01D 43/06 |
| 9,596,808 B2* | 3/2017 | Fay, II | ............ | A01D 75/004 |
| 9,603,306 B2* | 3/2017 | Fay, II | ............ | A01B 73/005 |
| 9,980,431 B2* | 5/2018 | Long | ............ | A01D 34/006 |
| 10,216,156 B2* | 2/2019 | Enns | ............ | G05B 15/02 |
| 2003/0005672 A1* | 1/2003 | Friesen | ............ | A01D 67/005 |
| | | | | 56/6 |
| 2003/0017036 A1* | 1/2003 | Harkcom | ............ | A01D 75/002 |
| | | | | 414/470 |
| 2011/0219738 A1* | 9/2011 | Thompson | ............ | A01D 34/661 |
| | | | | 56/13.5 |
| 2011/0283673 A1 | 11/2011 | Moersch et al. | | |
| 2013/0283746 A1* | 10/2013 | Chan | ............ | A01B 63/22 |
| | | | | 56/10.7 |
| 2013/0284467 A1* | 10/2013 | Snider | ............ | A01D 43/00 |
| | | | | 172/328 |
| 2016/0007534 A1* | 1/2016 | Fay, II | ............ | A01B 73/005 |
| | | | | 56/228 |
| 2016/0066509 A1* | 3/2016 | Fay, II | ............ | A01D 43/06 |
| | | | | 56/192 |
| 2019/0029173 A1* | 1/2019 | Noll | ............ | A01D 41/14 |

* cited by examiner

DRAPER HEADER FOR HARVESTER PROVIDING FLOATATION TO GAUGE WHEELS

BACKGROUND

Harvesters such as windrowers, tractors, forage harvesters, and mowers (e.g., self-propelled) generally include a header operable to cut crops. Typical construction for such harvesters include a cab mounted to a frame, front ground wheels mounted on the frame, rear ground wheels mounted on a respective caster, and a header mounted to the frame.

For acceptable header height control operation, gauge wheels are generally used to dampen oscillations caused by movement of the header both in the upward and downward directions. Coil springs have been used to apply ground force to the gauge wheels. However, coil springs are not adequate for automatic header height control systems as such springs do not provide adequate travel for varying cut heights during operation of the harvester. For example, when crop is taller at one end of a large field and the operator wishes to adjust to a higher cut height, the operator is forced to exit the cab to adjust the coil springs for the gauge wheels manually prior to continuing operation. Stopping of the operation and manual adjustment is therefore needed each time a cut height adjustment is desired.

SUMMARY

The disclosure relates to a draper header including a hydraulic system for adjusting cut height from the cab during operation of the harvester, with the hydraulic system passively adjusting to the desired cut height. Particularly, the hydraulic system provides gauge wheel spring force by using floatation pressure supplied to the lift arm cylinders during operation.

In accordance with some embodiments of the present disclosure, an exemplary draper header for a harvester is provided. The draper header comprises a chassis, first and second wheel supports pivotally coupled to the chassis, a first ground wheel rotatably coupled to the first wheel support, and a second ground wheel rotatably coupled to the second wheel support. The draper header comprises a first hydraulic cylinder pivotally coupled between the first wheel support and the chassis, and a second hydraulic cylinder pivotally coupled between the second wheel support and the chassis. In a lowered operation mode, hydraulic fluid is allowed to flow into at least one of first and second hydraulic cylinders to extend the first and second hydraulic cylinders to lower the first and second ground wheels relative to the chassis. In a raised operation mode, the hydraulic fluid is released from at least one of the first and second hydraulic cylinders to retract the first and second hydraulic cylinders to raise the first and second ground wheels relative to the chassis.

The first and second hydraulic cylinders are independently actuated to independently regulate lowering and raising of the first and second ground wheels. In the lowered operation mode and the raised operation mode, extending or retracting the first and second hydraulic cylinders rotates the first and second wheel supports relative to the chassis. In the lowered operation mode, the hydraulic fluid provides floatation pressure from lift cylinders associated with the harvester. The floatation pressure provides a springing or dampening force to the first and second ground wheels. Particularly, the gauge wheels of the harvester are able to lift only during a header lift operation, since this is when the gauge wheel cylinders receive the oil or hydraulic fluid supply. The gauge wheels do not lift independently of the lift cylinders and do not float independently of the lift cylinders.

In certain embodiments, the harvester (or header for a harvester) comprises a right-hand side combined lift/float hydraulic cylinder and a left-hand side combined lift/float hydraulic cylinder fluidically connected to the first and second hydraulic cylinders. In certain embodiments, the harvester comprises a right-hand side lift hydraulic cylinder, a right-hand side float hydraulic cylinder, a left-hand side lift hydraulic cylinder, and a left-hand side float hydraulic cylinder fluidically connected to the first and second hydraulic cylinders.

In accordance with some embodiments of the present disclosure, an exemplary harvester is provided. The harvester comprises a frame, first and second lift/float cylinders operably coupled to the frame and configured to selectively lift and lower a draper header relative to the frame, and the draper header. The draper header comprises a chassis, first and second wheel supports pivotally coupled to the chassis, a first ground wheel rotatably coupled to the first wheel support, and a second ground wheel rotatably coupled to the second wheel support. The draper header comprises a first hydraulic cylinder pivotally coupled between the first wheel support and the chassis, and a second hydraulic cylinder pivotally coupled between the second wheel support and the chassis. In a lowered operation mode, hydraulic fluid is allowed to flow into at least one of first and second hydraulic cylinders to extend the first and second hydraulic cylinders to lower the first and second ground wheels relative to the chassis. In a raised operation mode, the hydraulic fluid is released from at least one of the first and second hydraulic cylinders to retract the first and second hydraulic cylinders to raise the first and second ground wheels relative to the chassis.

In the lowered operation mode, the hydraulic fluid provides floatation pressure from the respective first and second lift cylinders. In certain embodiments, each of the first and second lift/float cylinders comprises a combined lift/float hydraulic cylinder. In certain embodiments, each of the first and second lift/float cylinders comprises a lift hydraulic cylinder separate from a float hydraulic cylinder.

Height control of the gauge wheels is not provided by the hydraulic system. Rather, the gauge wheels are either in a raised position or a lowered position. The gauge wheel cylinders are open to the corresponding lift cylinders (right-hand side or left-hand side), which opens the gauge wheel cylinders to the header lift floatation accumulator. Floatation pressure is thereby provided to the gauge wheel cylinders, with the position of the gauge wheels being dictated by passively traveling over terrain. The header floatation pressure in the lift system can be adjusted to adequately float the weight of the header mounted on the windrower or harvester, and the amount of floatation provided by the gauge wheels is a percentage of the lift floatation based on the geometry of the system (e.g., cylinder bores, lift arm moments, gauge wheel moments, combinations thereof, or the like), and can be optimized for the type of header being used.

The system does not provide pressure feedback of the gauge wheel circuit independently from the lift system, because floatation pressure in the gauge wheel cylinders is substantially equal to the pressure in the lift cylinder and the two share an accumulator. There is no gauge wheel position feedback and no ability to use the gauge wheels for header height control. The exemplary system is intended to provide springing to the gauge wheels to stabilize the header during operation, and the gauge wheels are raised up during the header lift operation at the end of a row to clear the windrows. In the exemplary system, either the right-hand side lift floatation pressure can be used for the right-hand side gauge wheel cylinder, the left-hand side lift floatation pressure can be used for the left-hand side gauge wheel cylinder, or both gauge wheel cylinders can use the lift floatation pressure/accumulator from one side of the lift system (e.g., either right-hand side or left-hand side).

In some embodiments, charge pressure can be used to provide a constant supply of hydraulic flow and low pressure. The charge pressure can be used to provide hydraulic springing to the gauge wheels. Through proper sizing of the cylinders on the gauge wheels (based on the weight of the header), and the fact that charge pressure is constant, a near ideal amount of ground force can be provided by the gauge wheel cylinders. Such exemplary system is intended to provide a stabilizing effect by pushing down on the gauge wheels, and does not control header height. In such embodiments, there is no position feedback or adjustable pressure in the gauge wheel circuit. Particularly, the pressure generally stays the same as the charge relief. Such function can be accomplished with any constant source of flow and pressure, a dedicated cooling circuit, a steering circuit, a braking circuit, and the like.

In accordance with embodiments of the present disclosure, an exemplary draper header for a harvester is provided. The draper header comprises a chassis, first and second wheel supports pivotally coupled to the chassis, a first ground wheel rotatably coupled to the first wheel support, and a second ground wheel rotatably coupled to the second wheel support. The draper header comprises a first hydraulic cylinder pivotally coupled between the first wheel support and the chassis, and a second hydraulic cylinder pivotally coupled between the second wheel support and the chassis. The first and second hydraulic cylinders are fluidically coupled to a charge pressure of the harvester. The charge pressure provides a floatation pressure to position the first and second ground wheels at a lowered operation mode and a raised operation mode.

In the lowered operation mode, hydraulic fluid is allowed to flow into at least one of first and second hydraulic cylinders to extend the first and second hydraulic cylinders to lower the first and second ground wheels relative to the chassis. In the raised operation mode, the hydraulic fluid is released from at least one of the first and second hydraulic cylinders to retract the first and second hydraulic cylinders to raise the first and second ground wheels relative to the chassis.

The first and second hydraulic cylinders can be independently actuated to independently regulate lowering and raising of the first and second ground wheels. The draper header includes a selector valve fluidically coupled to the first and second hydraulic cylinders and configured to provide the charge pressure to the first and second hydraulic cylinders. The draper header includes a directional valve fluidically coupled to the selector valve.

In accordance with embodiments of the present disclosure, an exemplary harvester is provided. The harvester comprises a frame, first and second lift/float cylinders operably coupled to the frame and configured to selectively lift and lower a draper header relative to the frame, and the draper header. The draper header comprises a chassis, first and second wheel supports pivotally coupled to the chassis, a first ground wheel rotatably coupled to the first wheel support, and a second ground wheel rotatably coupled to the second wheel support. The draper header comprises a first hydraulic cylinder pivotally coupled between the first wheel support and the chassis, and a second hydraulic cylinder pivotally coupled between the second wheel support and the chassis. The first and second hydraulic cylinders are fluidically coupled to a charge pressure of the harvester. The charge pressure provides a floatation pressure to position the first and second ground wheels at a lowered operation mode and a raised operation mode.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed harvester header, reference is made to the accompanying figures, wherein.

DETAILED DESCRIPTION

Figure 1:
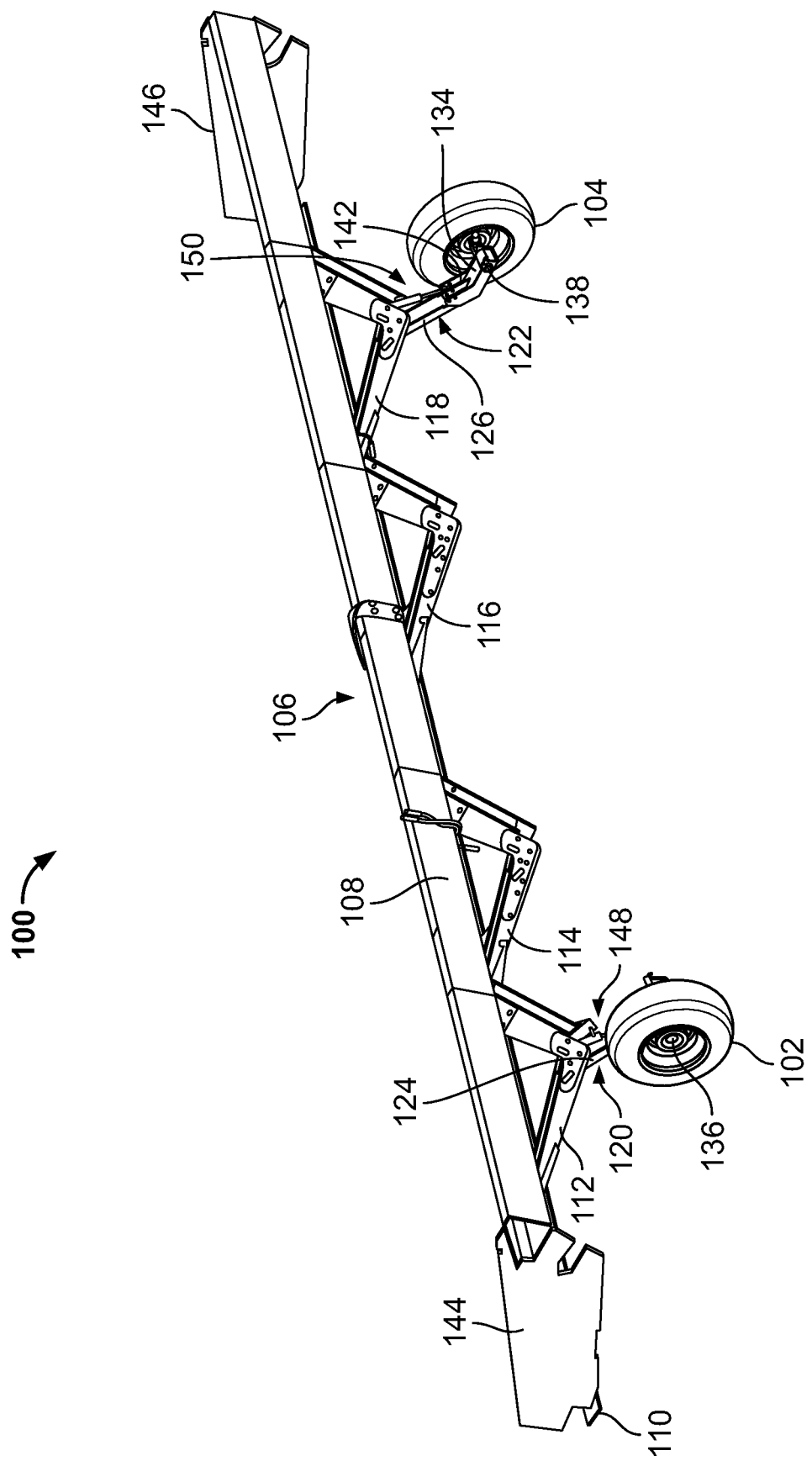
FIG. 1 is a rear perspective view of an exemplary harvester header of the present disclosure in a wheels lowered configuration.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g., 3, 4, or 5.

The term "plurality" as used herein is defined as any amount or number greater or more than 1. In some embodiments, the term "plurality" means 2, 3, 4, 5, 6 or more.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "about" or "approximately" as used herein when referring to a measurable value such as an amount, a temporal duration, and the like, is meant to encompass variations of ±20%, ±10%, ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% from the specified value, as such variations are appropriate to perform the disclosed methods.

The term "harvester" as used herein is defined as a machine that consolidates and/or packages material so as to facilitate the storage and handling of the material for later use. In some embodiments, the harvester is used to harvest agricultural material. In some embodiments, the harvester is a windrower, a forage harvester, lawn mower or a combine including a baling mechanism. In some embodiments, the harvester is a self-propelled windrower.

The term "material" as used herein is defined as a numerous individual items that are harvested or collected by the harvester. In some embodiments, the material is agricultural crop, such as hay or silage. In some embodiments, the material is biomass.

The term "drive system" as used herein is defined as an assembly, hydraulic or mechanical arrangement that allows for control of the front and/or rear wheels of the harvester.

The term "information" as used herein is defined as data values attributed to parameters. In some embodiments, information is digital and/or analog information. In some embodiments, information is the current operable mode of the harvester. In some embodiments, warning information can be audio and/or visual information. In some embodiments, warning information is information that is capable of alerting an operator that an action may need to be taken.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which comprises but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may comprise any apparatus that can contain, store, communicate, propagate, or transport the program for use by or in connection with the instruction execution system, or harvester. In some embodiments, the harvester comprises a software system with executable code that executes different hydraulic states based on operator settings. In some embodiments, the disclosure also relates to a computer software product with executable code that automatically toggles between or through different hydraulic states based on operator settings of the harvester. The software program product may be on any medium or a component of a system optionally configured for update or install into the software of an existing harvester.

In some embodiments, the medium may be or may comprise an electronic, magnetic, optical, electromagnetic, InfraRed (IR), or semiconductor system (or apparatus or device) or a propagation medium. Some demonstrative examples of a computer-readable medium may comprise a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks comprise Compact Disk-Read-Only Memory (CD-ROM), Compact Disk-Read/Write (CD-R/W), DVD, or the like.

In some embodiments, the disclosure relates to a processing system including a processing device suitable for storing and/or executing program code and may comprise at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. In some embodiments, the memory is capable of storing preferred settings or information about setting the wheel height of the harvester.

In some embodiments, input/output or I/O devices (including but not limited to keyboards, displays, pointing devices, etc.) may be coupled to the system either directly or through intervening I/O controllers. In some embodiments, I/O devices may be coupled to the system directly or to I/O controller by an I/O bus (cables and or wires which connect the devices and enable the information to pass therebetween). In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used. Any sensor disclosed herein may function on any disclosed harvester by integration into one or more data processing systems of the harvester. For example, in some embodiments, the disclosure relates to a data processing system including executable software program product configured for sending and receiving information about the settings of the harvester.

The term "real-time" and the phrase "in real-time" as used herein are defined as a way of describing a process, event, or action that occurs simultaneously with the process of actively operating a harvester. In some embodiments, various sensors continuously sense information about the harvester and transmit that information to a controller in real-time. In some embodiments, an operator may adjust values or thresholds for one or more hydraulic states in real-time through the operator interface by accessing the system electronically and inputting one or a plurality of values.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Windrowers and tractors, such as self-propelled windrowers, are well known in the agricultural industry, and the instant invention can be used with substantially any of such machines. Reference is made, for example, to U.S. Pat. Nos. 9,101,090 and 8,020,648; that illustrate such windrowers, the disclosures of which are incorporated herein by reference in their entireties. The present invention may also find utility in agricultural harvesters including, for example, a self-propelled windrower, a forage harvester, and a lawn mower.

In some embodiments, the method is performed by a harvester comprising a crop supply chamber, a crop gating system, and one or more sensors. In some embodiments, the one or more sensors are capable of determining a range of information. In some embodiments, the one or more sensors are in electronic communication with one or more controllers. In some embodiments, the one or more sensors can be a wheel position sensor, or the like. In some embodiments, additional sensors can be used to assist in field function of the windrower by sensing, e.g., speed of discs/conditioner rolls on disc heads, speed of reels, sickles, and draper belts on draper units, and merger belt speed and/or merger position (if a crop merger is in use), lift arm height, header tilt, ground clearance, combinations thereof, or the like.

Figure 2:
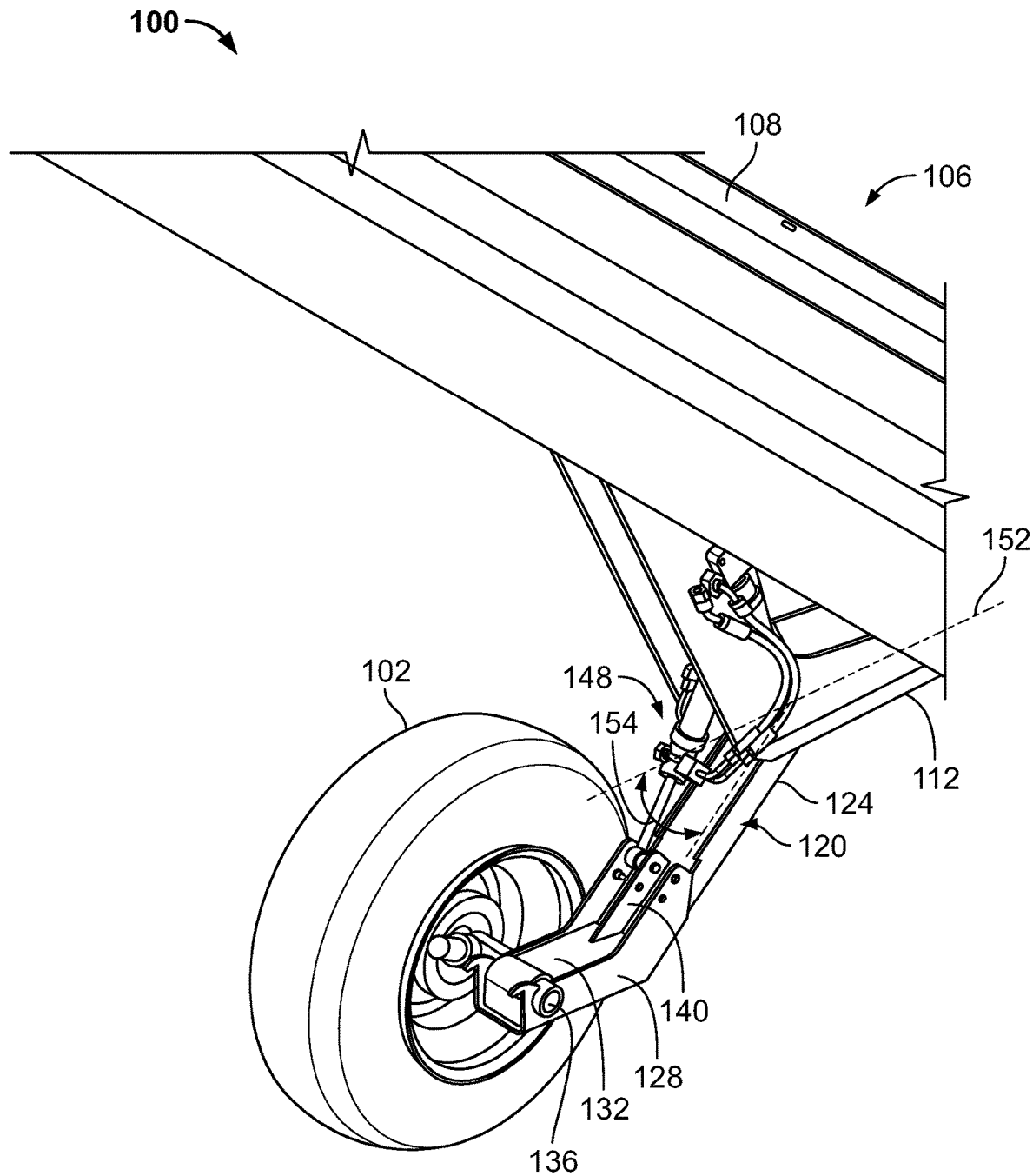
FIG. 2 is a detailed perspective view of an exemplary harvester header of FIG. 1 in a wheels lowered configuration.
Figure 3:
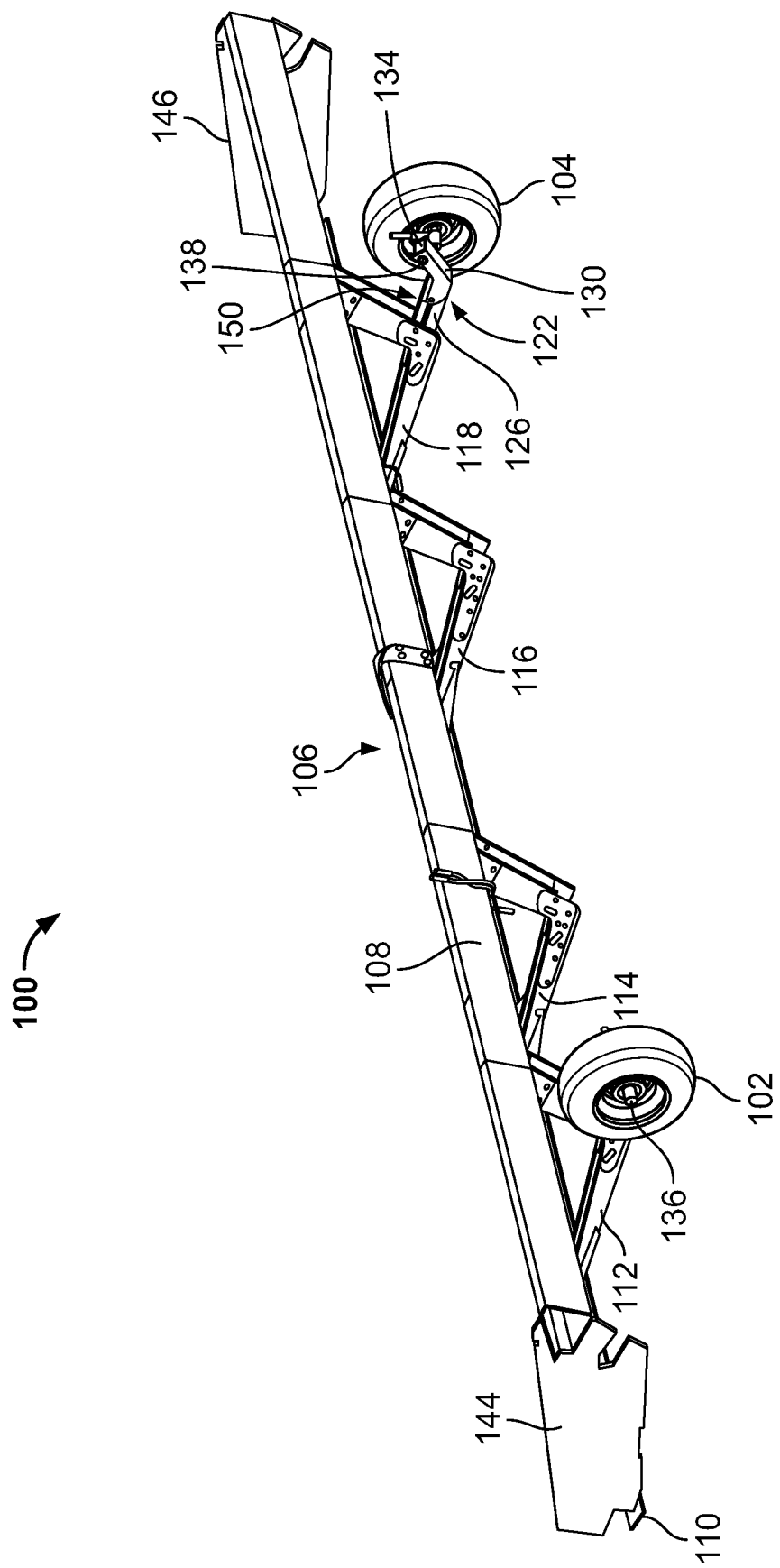
FIG. 3 is a rear perspective view of an exemplary harvester header of FIG. 1 in a wheels raised configuration.
Figure 4:
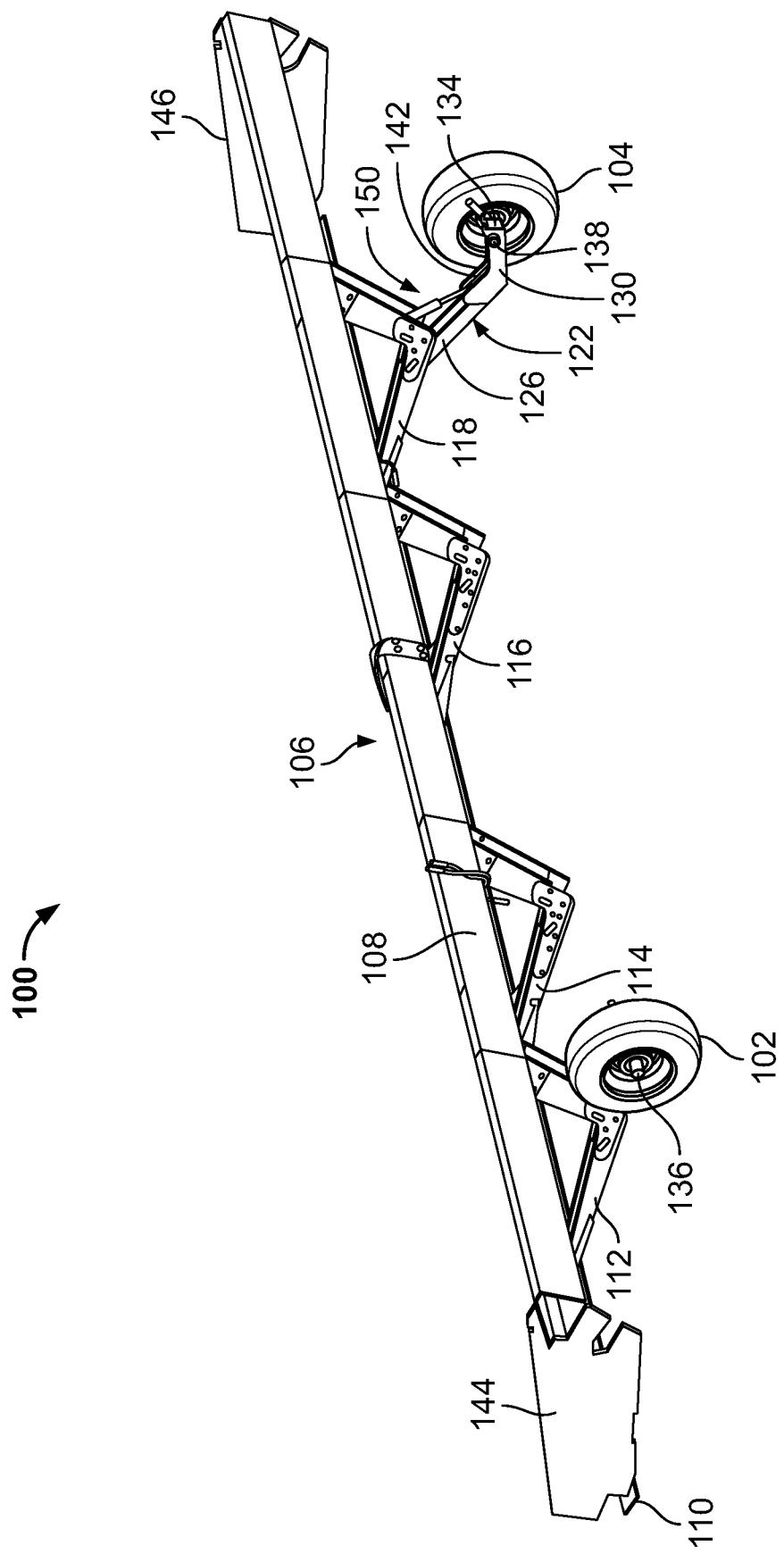
FIG. 4 is a rear perspective view of an exemplary harvester header of FIG. 1 in an uneven configuration including one wheel in a lowered configuration and another wheel in a raised configuration.

FIGS. 1-4 show perspective views of an exemplary harvester header 100 with ground wheels 102, 104 in different configurations. Particularly, FIGS. 1 and 2 show the header 100 with the wheels 102, 104 in a lowered configuration, FIG. 3 shows the header 100 with the wheels 102, 104 in a raised configuration, and FIG. 4 shows the header 100 with the wheel 102 in a raised configuration and the wheel 104 in a lowered configuration for uneven terrain. The wheels 102, 104 are configured to be raised or lowered when the header 100 is raised or lowered, and therefore operate in a coordinated manner with each other. The height of the wheels 102, 104 are capable of following the terrain in order to stabilize the header 100, and the height of the header 100 over the terrain is controlled by the height settings of lift arms and/or lift cylinders.

The header 100 comprises a chassis 106 with a distal end frame 108 defining the rear of the header 100, and a proximal end frame 110 defining the front or leading edge of the header 100. The frames 108, 110 extend between the right and left sides of the header 100 in a substantially parallel manner, and generally transversely to the direction of travel of the header 100. The chassis 106 comprises central members 112-118 mounted between and connecting the frames 108, 110. In certain embodiments, the central members 112-118 can be formed from one or more brackets, and define substantially L-shaped configurations. Although not shown for clarify, it should be understood that a cutting mechanism (and other components of the header 100) can be mounted to the chassis 106 for harvesting crop. The chassis 106 can comprise side members 144, 146 mounted between the frames 108, 110 to prevent loss of harvested crop on the sides of the header 100.

The header 100 comprises wheel supports 120, 122 with respective wheels 102, 104 rotatably coupled at one end and the opposing end of the wheel supports 120, 122 pivotally coupled to respective central members 112, 118. Although shown as including two wheels 102, 104, it should be understood that additional wheels can be similarly mounted to the central members 114, 116 using wheel supports. In certain embodiments, each wheel support 120, 122 can comprise a linear U-shaped bracket 124, 126 pivotally mounted to the central member 112, 118, a U-shaped bracket 128, 130 coupled to the bracket 124, 126, and an angled bar 132, 134 disposed within the brackets 124-130. One end of the bracket 128, 130 can rotatably receive an axle 136, 138 connected to the wheels 102, 104. The bar 132, 134 comprises a flange 140, 142 extending therefrom and coupled to the hydraulic actuation mechanism of the header 100.

The hydraulic actuation mechanism comprises a hydraulic cylinder 148, 150 (e.g., a lift cylinder) coupled to the central members 112, 118 at one end and coupled to the flange 140, 142 at the opposing end to raise and lower the wheels 102, 104. Each hydraulic cylinder 148, 150 comprises a rod end and a barrel end. In certain embodiments, the rod end of the hydraulic cylinder 148, 150 can be pivotally mounted to the flange 140, 142, and the barrel end of the hydraulic cylinder 148, 150 can be pivotally mounted to the central member 112, 118. Actuation of the hydraulic cylinder 148, 150 into an extended configuration (see, e.g., FIGS. 1 and 2) pivots the wheel support 120, 122 relative to the central member 112, 118 to lower the wheel 102, 104. In the lowered configuration, the bracket 124, 126 is angled downwardly relative to a plane 152 passing through the central members 112-118 by an angle 154 (see, e.g., FIG. 2).

Actuation of the hydraulic cylinder 148, 150 into a retracted configuration (see, e.g., FIG. 3) pivots the wheel support 120, 122 into a space of the central member 112, 118 to raise the wheel 102, 104. In the raised configuration, the bracket 124, 126 is substantially aligned with the plane 152 passing through the central members 112-118 (e.g., the angle 154 is approximately zero). As shown in FIG. 4, the hydraulic cylinders 148, 150 are capable of lowering or raising the wheels 102, 104 based on the terrain over which the header 100 passes. Particularly, during mowing operation, the barrel end of the cylinders 148, 150 is opened to lift floatation pressure/accumulator and the wheels 102, 104 follow the terrain passively. The position of the wheels 102, 104 relative to the chassis 106 can therefore be lowered when open to lift/float accumulators, and raised when the header 100 is lifted. Such lowering and lifting can occur without stopping operation of the harvester, and without manual adjustment of the wheels 102, 104 by the operator.

Figure 5:
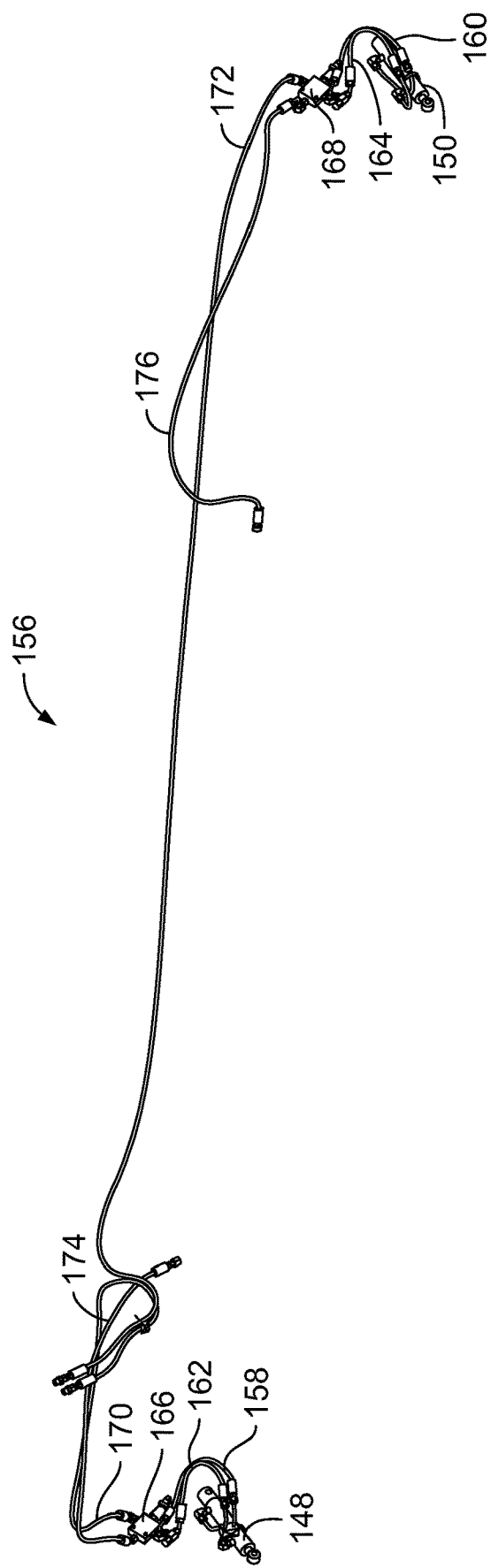
FIG. 5 is a diagrammatic view of a hydraulic system of an exemplary harvester header of FIG. 1.

FIG. 5 is a diagrammatic view of an exemplary hydraulic system 156 for actuation of the hydraulic cylinders 148, 150. The hydraulic system 156 comprises vent and pressure hoses or lines 158-164 fluidically coupled between the hydraulic cylinders 148, 150 and valves 166, 168. Each valve 166, 168 is further fluidically coupled to hoses or lines 170-176. Lines 174, 176 are return to tank hoses from valves 166, 168 to the windrower. Lines 170, 172 are pressure hoses coming from the lift cylinders on the windrower to the valve 166. Lines 158, 162 connect cylinder 148 to valve 166. Lines 160, 164 connect cylinder 150 to valve 168.

The wheels 102, 104 can provide a constant percentage of ground force compared to the total floatation force provided by the hydraulic cylinders 148, 150. Below are examples of ground and floatation forces for illustrative purposes, and such values do not represent actual values for proper header function. As an example, if the header 100 of "A" feet in width (as measured between the side members 144, 146) has a total floatation force of about 6,000 lbs upward, the gauge wheels 102, 104 can provide about 1,600 lbs of force downward. As a further example, if the header 100 of "B" feet in width has a total floatation force of about 3,000 lbs upward, the gauge wheels 102, 104 can provide about 800 lbs of force downward. In both examples, the wheels 102, 104 provide about 26.7% of force that the lift cylinders of the harvester are providing.

For such examples, the hydraulic cylinders 148, 150 can be sized such that the springing surface (either rod end or barrel end) provides about 26.7% of the force of the lift cylinders at the same pressure, and the same hydraulic supply can be used for both functions. For such examples, the hydraulic cylinders 148, 150 on the wheels 102, 104 can be about 26.7% of the size of the lift cylinders, with variation occurring depending on whether the hydraulic cylinders 148, 150 extend or retract to provide ground force. The disclosed hydraulic system 156 can therefore be used for differently sized headers 100, with the geometry of the hydraulic cylinders 148, 150 and lift cylinders remaining substantially constant.

In operation, the hydraulic cylinders 148, 150 can be actuated to extend or retract as desired by the operator to lift or lower with the header 100. For example, when the header 100 is lowered for operation and the lift cylinders of the harvester are floating on the accumulators, the hydraulic cylinders 148, 150 are opened to the floatation pressure (e.g., the barrel end in the configuration shown in the figures) and remain in the open to pressure position as long as the header 100 is in the lowered, float position. By having both wheels 102, 104 plumbed into the corresponding side of the independent lift circuit, the gauge wheel force to the particular head is tailored by providing a ground force ratio based on floatation of the specific side of the header, which can vary on headers which are not balanced side-to-side.

The wheels 102, 104 are actuated into a raised position when the header 100 is lifted. In the raising operation, rather than the barrel end of the hydraulic cylinders 148, 150, the rod end of the cylinders 148, 150 is opened to the header lift pressure, retracting the cylinders 148, 150 and lifting the wheels 102, 104. Such operation eliminates the need for the operator to lift the wheels 102, 104 manually when reconfiguring the header 100 for a transport position. In certain embodiments, the timing of the lifting operation can be such that the wheels 102, 104 are lifted (e.g., valves are open to lift pressure on the rod end of the cylinders 148, 150) until the header 100 is completely lifted, thereby not affecting the lift performance or time of the header 100.

In some embodiments, the exemplary system uses lift floatation pressure rather than charge pressure as the hydraulic springing force, providing a gauge wheel ground force as a constant ratio to lift floatation force independent of the header size. The system provides a spring force for the wheels 102, 104 on the header 100 which are linked to the lift floatation set point, eliminating the need for operator input for the proper gauge wheel cylinder 148, 150 pressure setting. Because the system does not use the charge pressure as a spring force, the possibility that the charge pressure fluctuates due to uneven ground conditions while in operation is eliminated. Particularly, the same floatation pressure source is used for the purpose of providing floatation pressure to the lift cylinders and the gauge wheel cylinders 148, 150. The logic for controlling the cylinders 148, 150 involves opening the barrel ends to lift (float) pressure, and opening the rod ends to lift (full lift relief) pressure. In some embodiments, charge pressure can be used as the hydraulic springing force.

Figure 6:
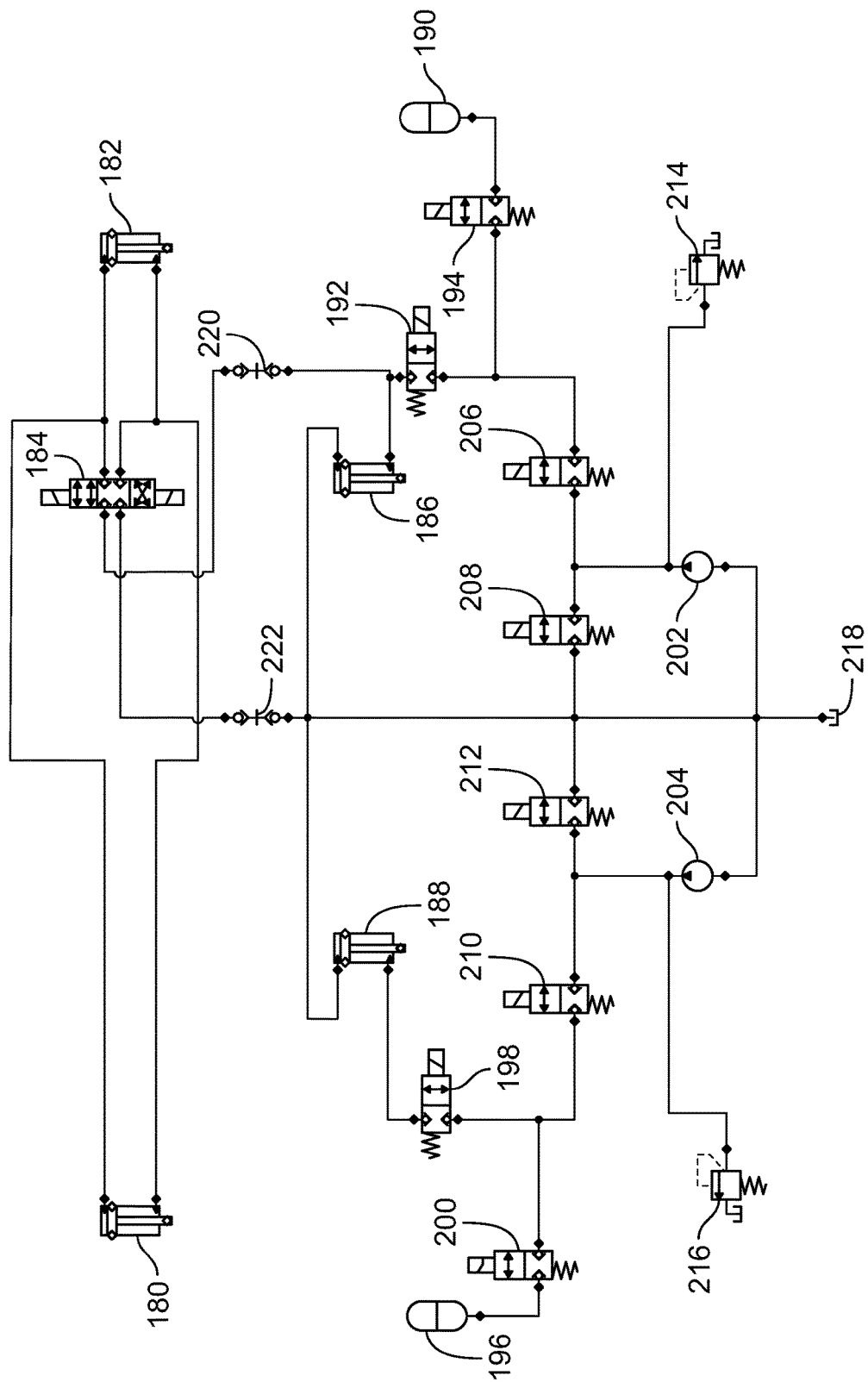
FIG. 6 is a static image of a hydraulic circuit for an exemplary harvester and header of the present disclosure including a single accumulator with combined lift and float cylinders.
Figure 9:
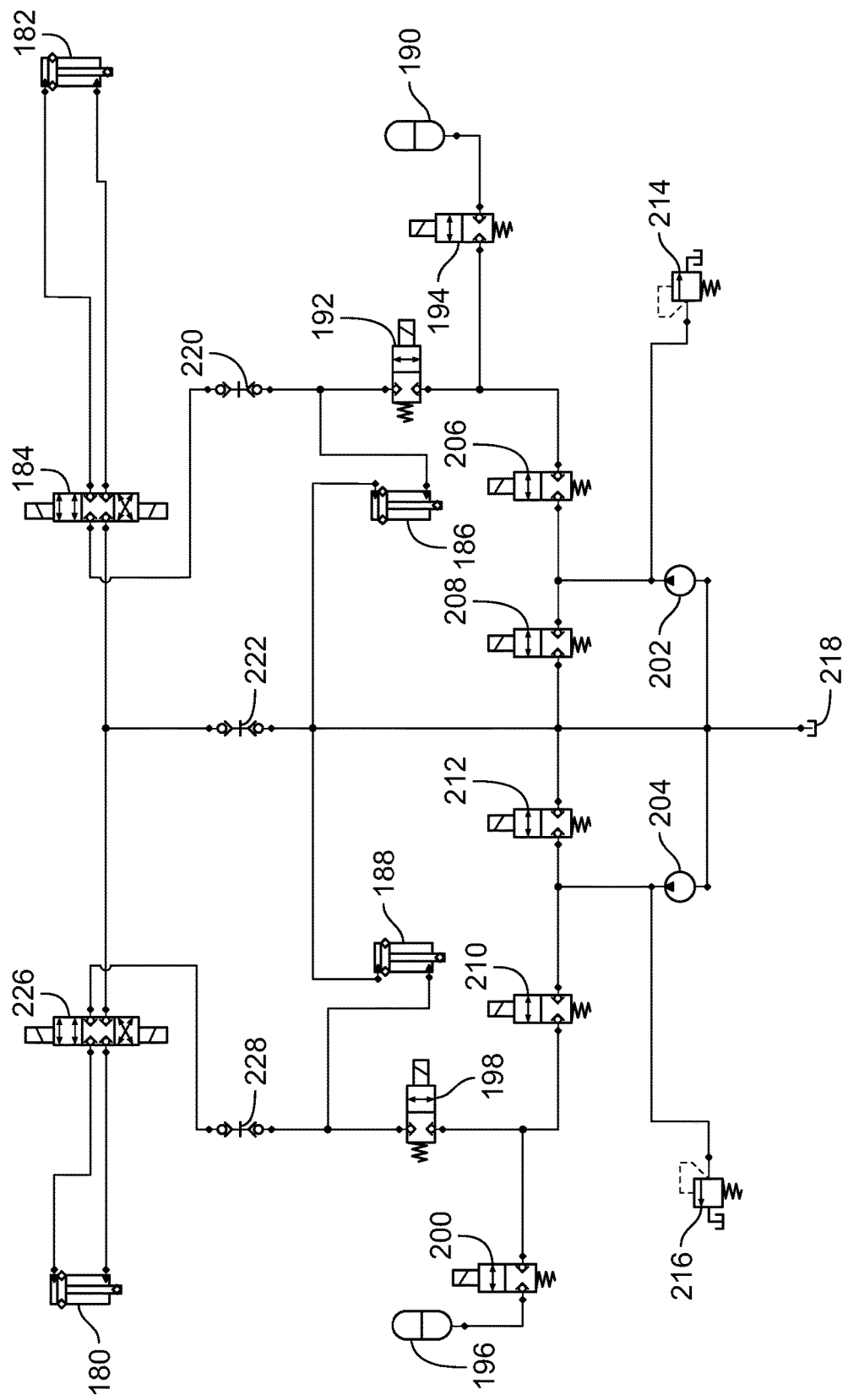
FIG. 9 is a static image of a hydraulic circuit for an exemplary harvester and header of the present disclosure including two accumulators with combined lift and float cylinders.

FIG. 6 is a hydraulic circuit 178 of the harvester and header 100 including both gauge wheel cylinders open to a single accumulator on the right-hand side lift/float cylinder with combined lift and float cylinders. The single accumulator designation refers to both left and right-hand side gauge wheel cylinders open to the accumulator on one side of the windrower. For example, in FIG. 6, both gauge wheel cylinders are open to the accumulator of the right-hand side lift/float system. Conversely, FIG. 9 shows a system where the gauge wheel cylinders are open to two separate accumulators. Particularly, in FIG. 9, the left-hand side gauge wheel cylinder is open to the left-hand side accumulator, while the right-hand side gauge wheel cylinder is open to the right-hand side accumulator.

With reference to FIG. 6, the hydraulic circuit 178 comprises a left-hand side gauge wheel hydraulic cylinder 180 and a right-hand side gauge wheel hydraulic cylinder 182 fluidically connected to a gauge wheel directional valve 184. The hydraulic circuit 178 comprises a right-hand side lift/float cylinder 186 fluidically connected to the valve 184, and fluidically connected to a left-hand side lift/float cylinder 188. Because the cylinders 186, 188 are connected through their barrel ends to tank, there is no control of pressure coupling the cylinders 186, 188, and the cylinders 186, 188 have independent lift pumps and floatation accumulators. The hydraulic circuit 178 comprises a right-hand side accumulator 190 fluidically connected to the cylinder 186 with valves 192, 194 positioned therebetween. The hydraulic circuit 178 comprises a left-hand side accumulator 196 fluidically connected to the cylinder 188 with valves 198, 200 positioned therebetween.

The hydraulic circuit 178 comprises a right-hand side lift pump 202 and a left-hand side lift pump 204, with valves 206-212 separating the pumps 202, 204 from each other, the cylinders 186, 188 and the accumulators 190, 196. The hydraulic circuit 178 comprises relief valves 214, 216 fluidically connected to the respective pumps 202, 204. The hydraulic circuit 178 comprises a reservoir or tank 218 fluidically connected to the valve 184. The barrel ends of cylinders 186, 188 and valves 208, 212 are also connected to tank 218. The hydraulic circuit 178 comprises couplers 220, 222 between the valve 184 and the cylinder 186 and tank 218. It should be understood that the components of the hydraulic circuit 178 shown below the couplers 220, 222 are disposed on the harvester, while the components shown above the couplers 220, 222 are disposed on the header 100.

In operation, lift and float pressure is provided by a single cylinder 186, 188 on each side. Floatation pressure and lift pressure are provided to both gauge wheels by either the right-hand side or left-hand side lift/float cylinders 186, 188 (right-hand side lift/float cylinder 186 in the embodiment of FIG. 6). The system does not compensate for uneven eight distribution of the header, and the ground force of the gauge wheel is proportional to the right-hand side floatation pressure only.

Figure 7:
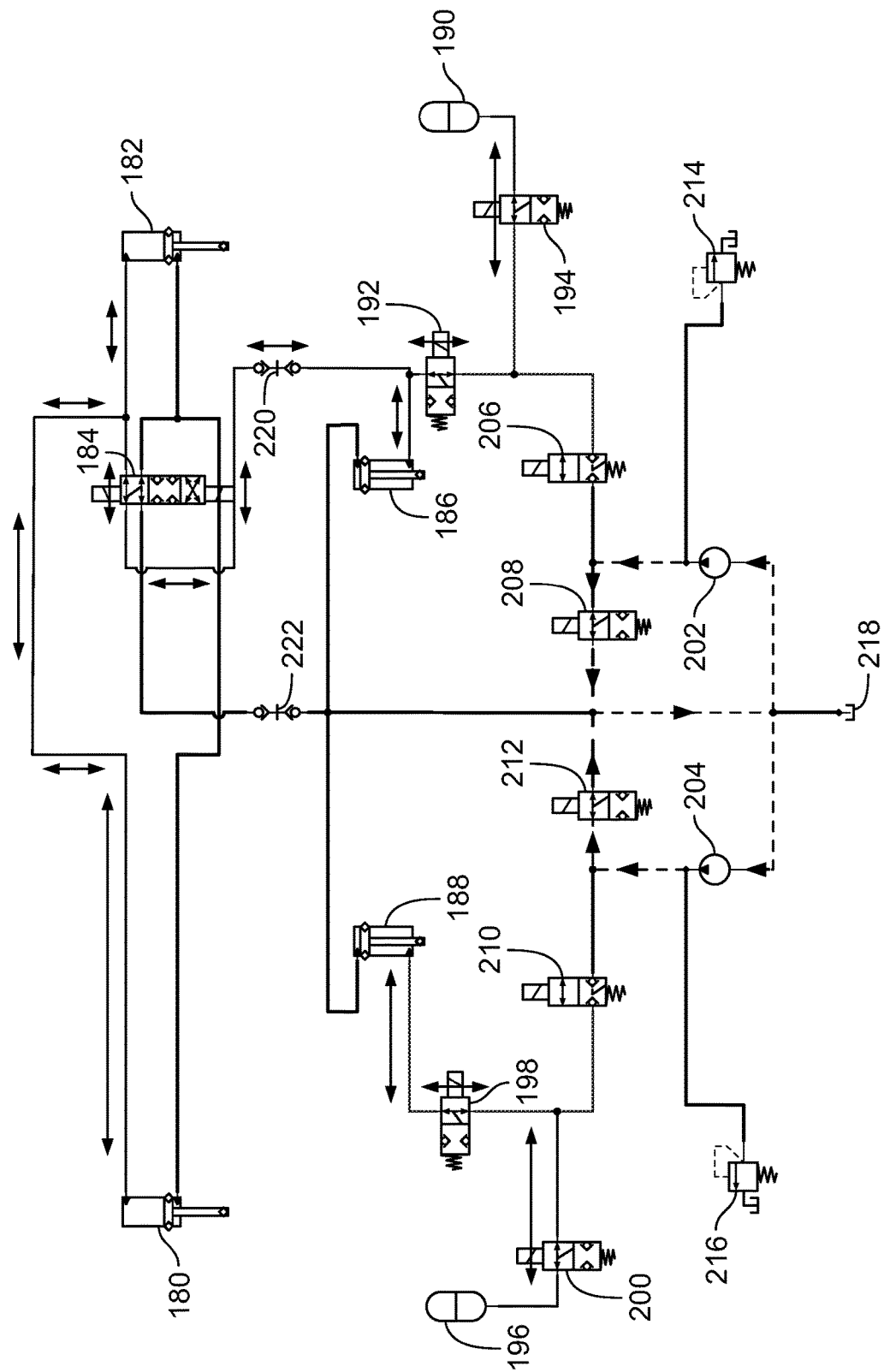
FIG. 7 is the hydraulic circuit of FIG. 7 in a mowing or field operation mode with active floatation.

FIG. 7 is the hydraulic circuit 178 of FIG. 6 in a mowing or field operation mode with active floatation. In this configuration, the accumulators 190, 196 provide floatation pressure to the lift cylinders 186, 188 and the header is lowered to the ground or at a mowing height. The gauge wheels are contacting the ground and the gauge wheel cylinders 180, 182 are being provided with floatation pressure from the right-hand side accumulator 190 through parallel connection to the right-hand side lift/float cylinder 186 and the state of the gauge wheel directional valve 184.

Figure 8:
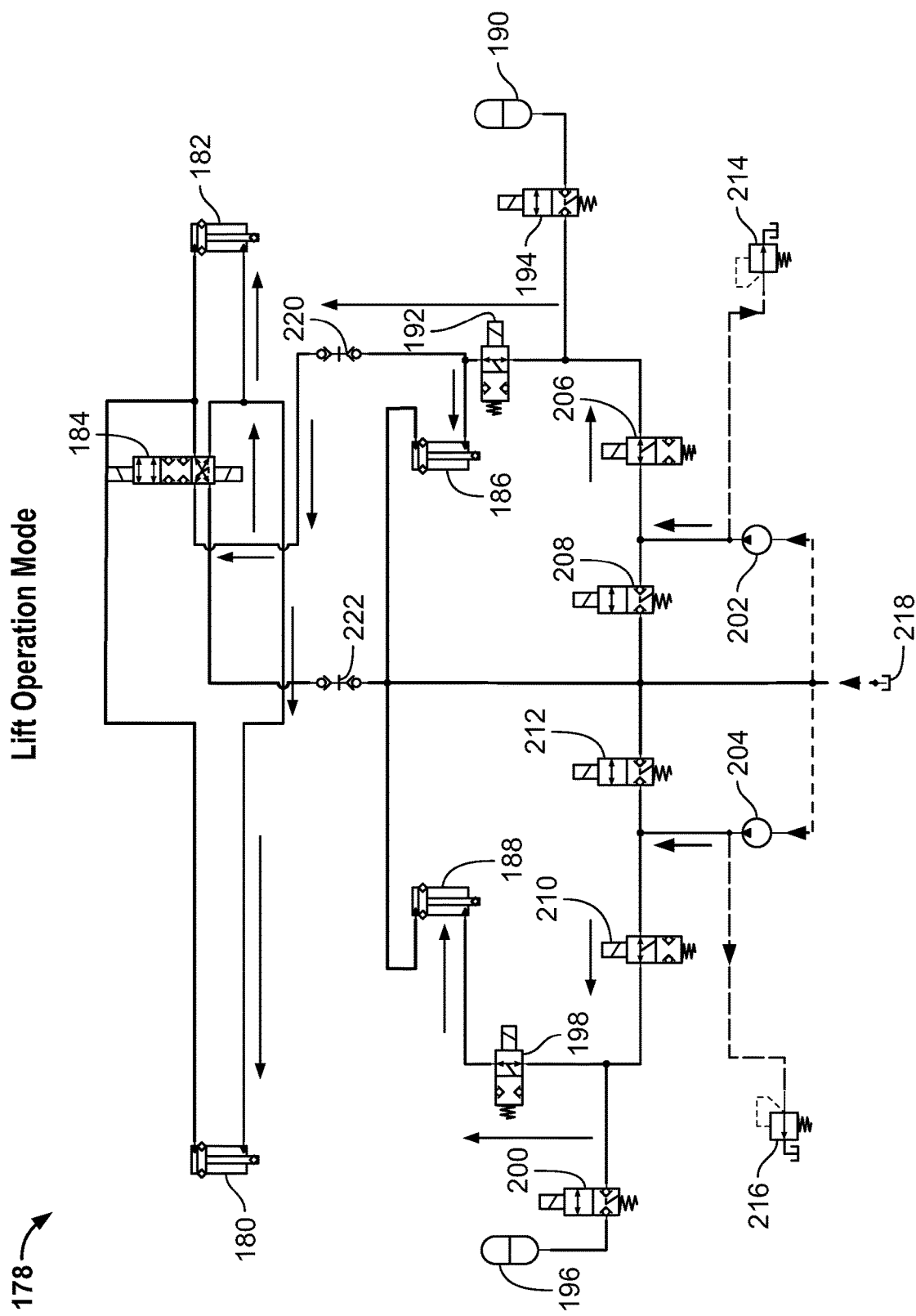
FIG. 8 is the hydraulic circuit of FIG. 7 in a lift operation mode.

FIG. 8 is the hydraulic circuit 178 of FIG. 6 in a lift operation mode. In this configuration, the accumulators 190, 196 are blocked from pump pressure and the lift cylinders 186, 188 are retracted to lift the header (or extended, depending on the design of the system). The gauge wheel directional valve 184 is shifted to provide lift pressure flow to lift the gauge wheels during the header lift operation.

FIG. 9 is a hydraulic circuit 224 of the harvester header 100 including two accumulators with combined lift and float cylinders. The hydraulic circuit 224 is substantially similar to the hydraulic circuit 178, except for the distinctions noted herein. Therefore, like reference numbers represent like components. Particularly, the hydraulic circuit 224 comprises dedicated gauge wheel directional valves 184, 226 for the right-hand side and left-hand side gauge wheel cylinders 182, 180. The left-hand side lift/float cylinder 188 is also fluidically connected to the valve 226, with a coupler 228 disposed therebetween.

In operation, the header lift and float is provided by one cylinder 186, 188 on each side. Floatation pressure and lift pressure are provided to the gauge wheels by the corresponding right-hand side and left-hand side lift/float cylinders 186, 188. The system provides floatation pressure to the gauge wheel equal to the floatation pressure in the corresponding side lift cylinder, thereby compensating for uneven weight distribution of the header.

Figure 10:
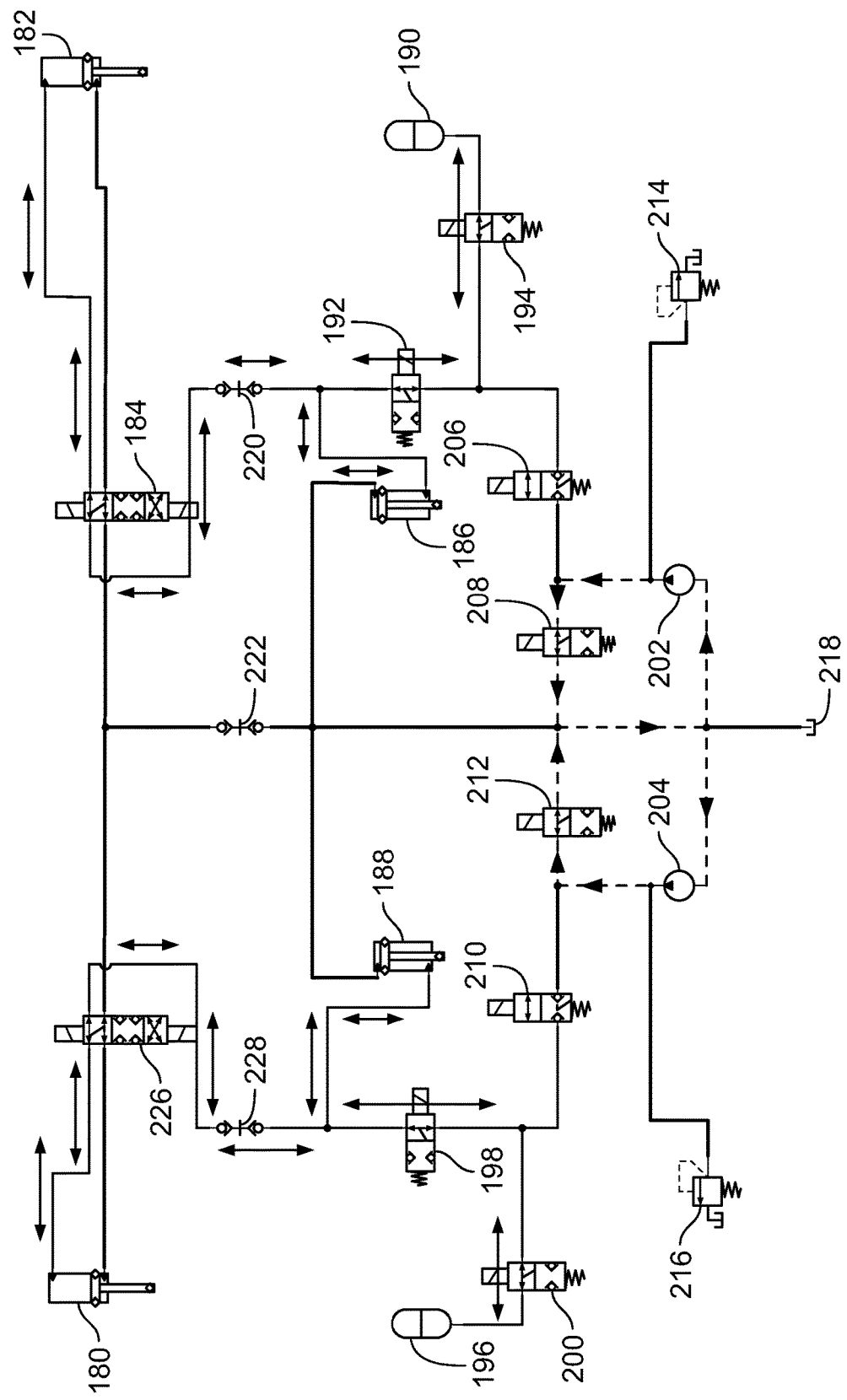
FIG. 10 is the hydraulic circuit of FIG. 9 in a mowing or field operation mode with active floatation.

FIG. 10 is the hydraulic circuit 224 of FIG. 9 in a mowing or field operation mode with active floatation. In this configuration, the accumulators 190, 196 provide floatation pressure to the lift cylinders 186, 188 and the header is lowered to the ground or at a mowing height. The gauge wheels are contacting the ground and the gauge wheel cylinders 180, 182 are provided with floatation pressure from the left-hand side and right-hand side accumulator 196, 190 through parallel connection to the corresponding lift/floatation cylinders 188, 186 and state of the gauge wheel directional valves 184, 226.

Figure 11:
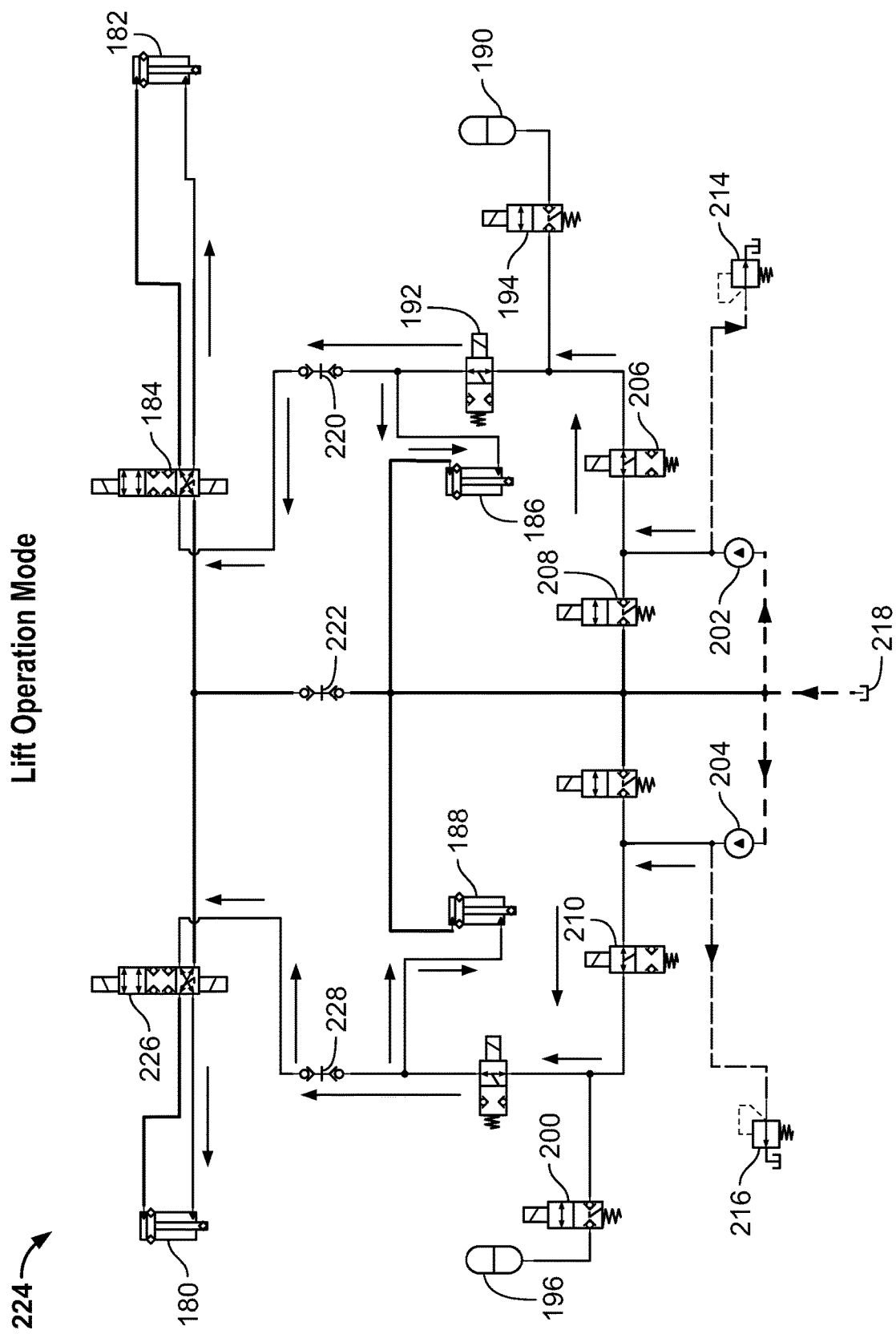
FIG. 11 is the hydraulic circuit of FIG. 9 in a lift operation mode.

FIG. 11 is the hydraulic circuit 224 of FIG. 9 in a lift operation mode. In this configuration, the accumulators 190, 196 are blocked from the pump pressure and the lift cylinders 186, 188 are retracted to lift the header (or extended, depending on the design of the system). The gauge wheel directional valves 184, 226 are shifted to provide lift pressure flow to lift the gauge wheels during the header lift operation.

Figure 12:
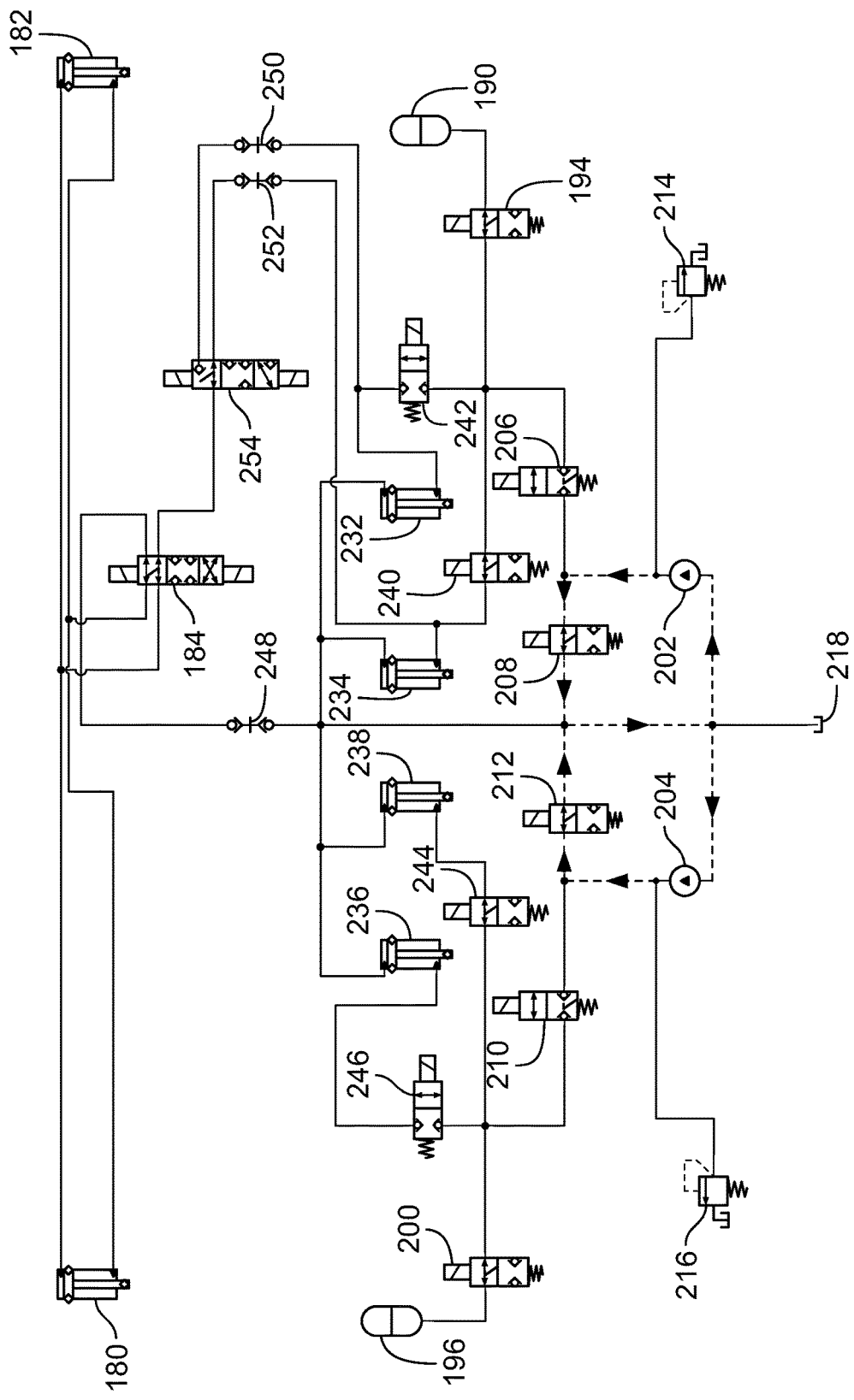
FIG. 12 is a static image of a hydraulic circuit for an exemplary harvester header of the present disclosure including a single accumulator with independent lift and float cylinders.

FIG. 12 is a hydraulic circuit 230 of the harvester header 100 including gauge wheel cylinders open to a single accumulator with independent lift and float cylinders. The hydraulic circuit 230 is substantially similar to the hydraulic circuits 178, 224, except for the distinctions noted herein. Therefore, like reference numbers represent like components. Particularly, rather than combined lift/float cylinders, the hydraulic circuit 230 comprises a dedicated right-hand side lift cylinder 232, a right-hand side float cylinder 234, a left-hand side lift cylinder 236, and a left-hand side float cylinder 238. The hydraulic circuit 230 comprises valves 240-246 between the respective cylinders 232-238 and the accumulators 190, 196. The hydraulic circuit 230 comprises a coupler 248 between the gauge wheel directional valve 184 and the tank 218. The valve 184 is fluidically coupled to a lift/float selector valve 254. The hydraulic circuit 230 comprises couplers 250, 252 between the selector valve 254 and the lift cylinder 232 and the float cylinder 234.

In operation, independent lift and floatation cylinders 232-238 are used, with two cylinders per side. The hydraulic gauge wheel cylinders 180, 182 are provided with floatation and lift pressure from one side only (e.g., the right-hand side in the embodiment of FIG. 12). Any components depicted below the couplers 248-252 are disposed on the harvester and any components depicted above the couplers 248-252 are disposed on the header 100. The system cannot compensate for uneven weight distribution of the header, and the ground force of the gauge wheel is proportional to the right-hand side floatation pressure.

Figure 13:
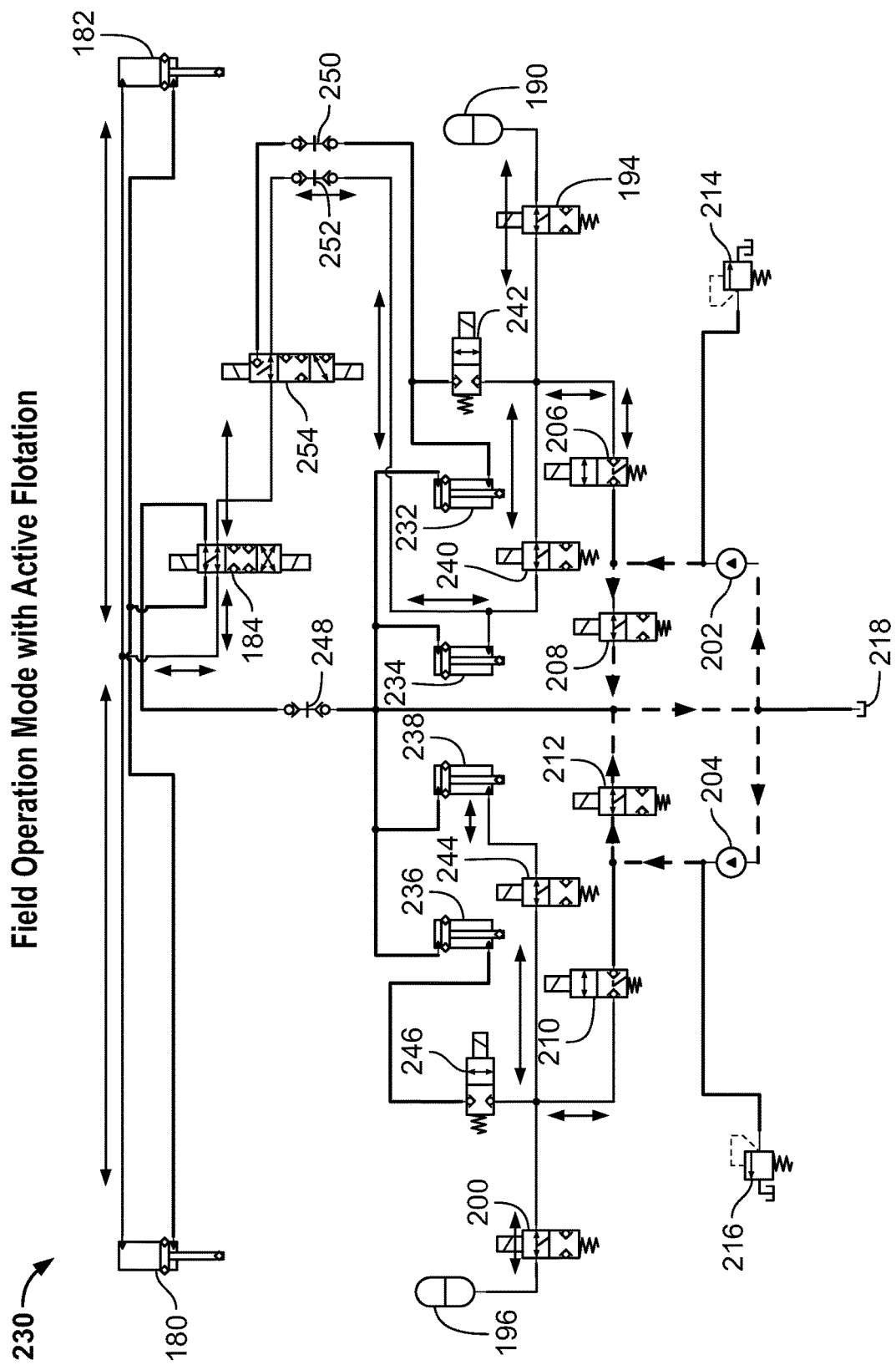
FIG. 13 is the hydraulic circuit of FIG. 12 in a mowing or field operation mode with active floatation.

FIG. 13 is the hydraulic circuit 230 of FIG. 12 in a mowing or field operation mode with active floatation. In this configuration, the accumulators 190, 196 provide floatation pressure to the floatation cylinders 234, 238 and the header is lowered to the ground or to a mowing height. The lift/float selector valve 254 is shifted to provide floatation pressure to the gauge wheel directional valve 184. The gauge wheels contact the ground and the gauge wheel cylinders 180, 182 are provided with floatation pressure from the right-hand side accumulator 190 through parallel connection to the floatation cylinder 234 and the state of the gauge wheel directional valve 184.

Figure 14:
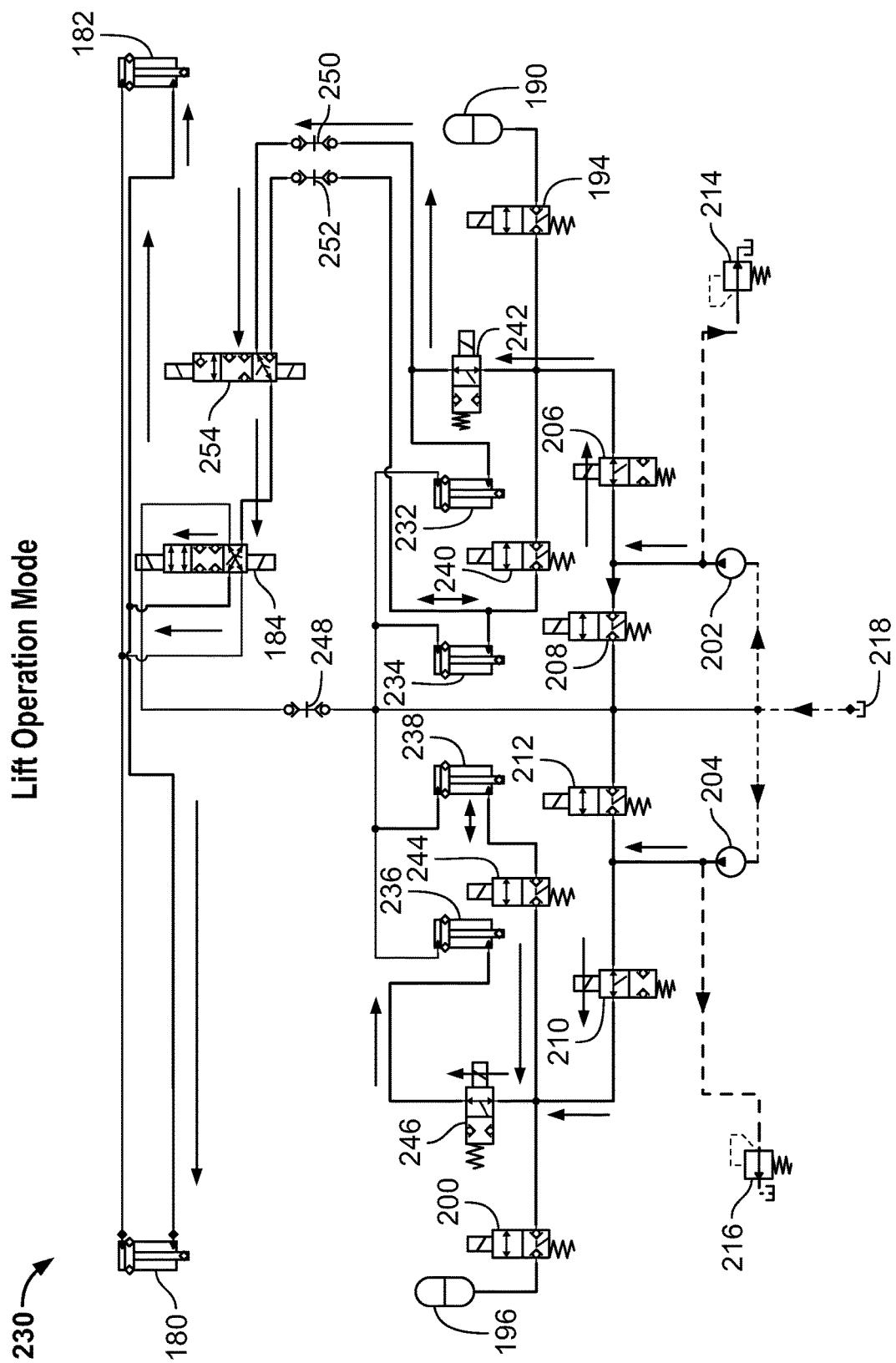
FIG. 14 is the hydraulic circuit of FIG. 12 in a lift operation mode.

FIG. 14 is the hydraulic circuit 230 of FIG. 12 in a lift operation mode. In this configuration, the accumulators 190, 196 are blocked from pump pressure and the lift cylinders 232, 236 are retracted to lift the header (or extended, depending on the design of the system). The lift/float selector valve 254 is shifted to provide lift pressure to the gauge wheel directional valve 184. The gauge wheel directional valve 184 is shifted to provide lift pressure flow to lift the gauge wheels during the header lift operation.

Figure 15:
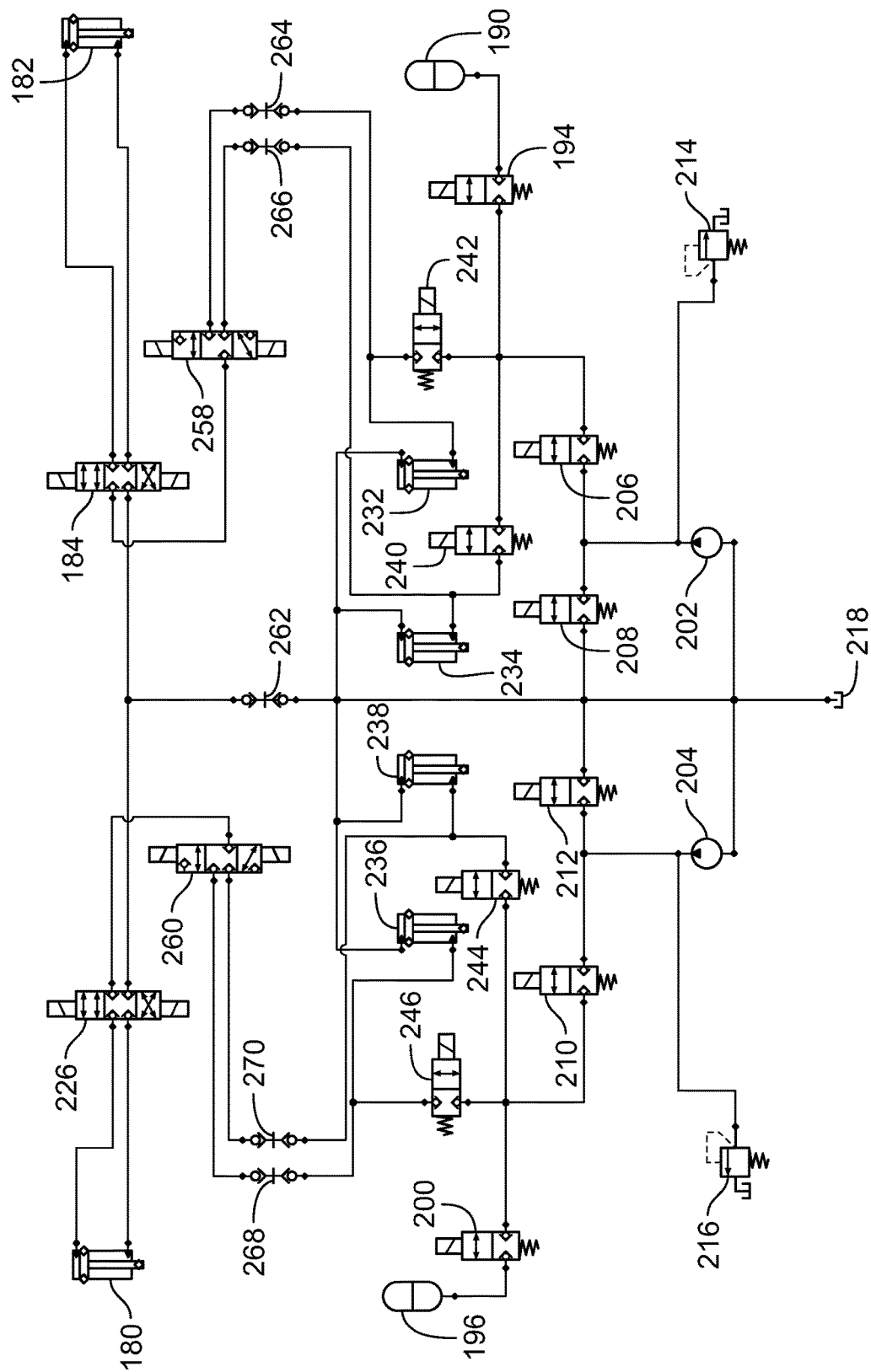
FIG. 15 is a static image of a hydraulic circuit for an exemplary harvester and header of the present disclosure including two accumulators with independent lift and float cylinders.

FIG. 15 is a hydraulic circuit 256 of the harvester header 100 including two accumulators with independent lift and float cylinders. The hydraulic circuit 256 is substantially similar to the hydraulic circuits 178, 224, 230 except for the distinctions noted herein. Therefore, like reference numbers represent like components. The hydraulic circuit 256 comprises a dedicated right-hand side lift/float selector valve 258 and a dedicated left-hand side lift/float selector valve 260. The hydraulic circuit 256 comprises a coupler 262 between the directional valves 184, 226 and the tank 218, couplers 264, 266 between the selector valve 258 and the lift and float cylinders 232, 234, and couplers 268, 270 between the selector valve 260 and the lift and float cylinders 236, 238.

In operation, the lift and float are provided by separate cylinders, two per side. The floatation pressure and the lift pressure are provided to both gauge wheels by the corresponding lift and float cylinders 232-238. The system provides floatation pressure to the gauge wheel proportional to the floatation pressure in the corresponding side floatation cylinder 234, 238, thereby compensating for uneven weight distribution of the header 100.

Figure 16:
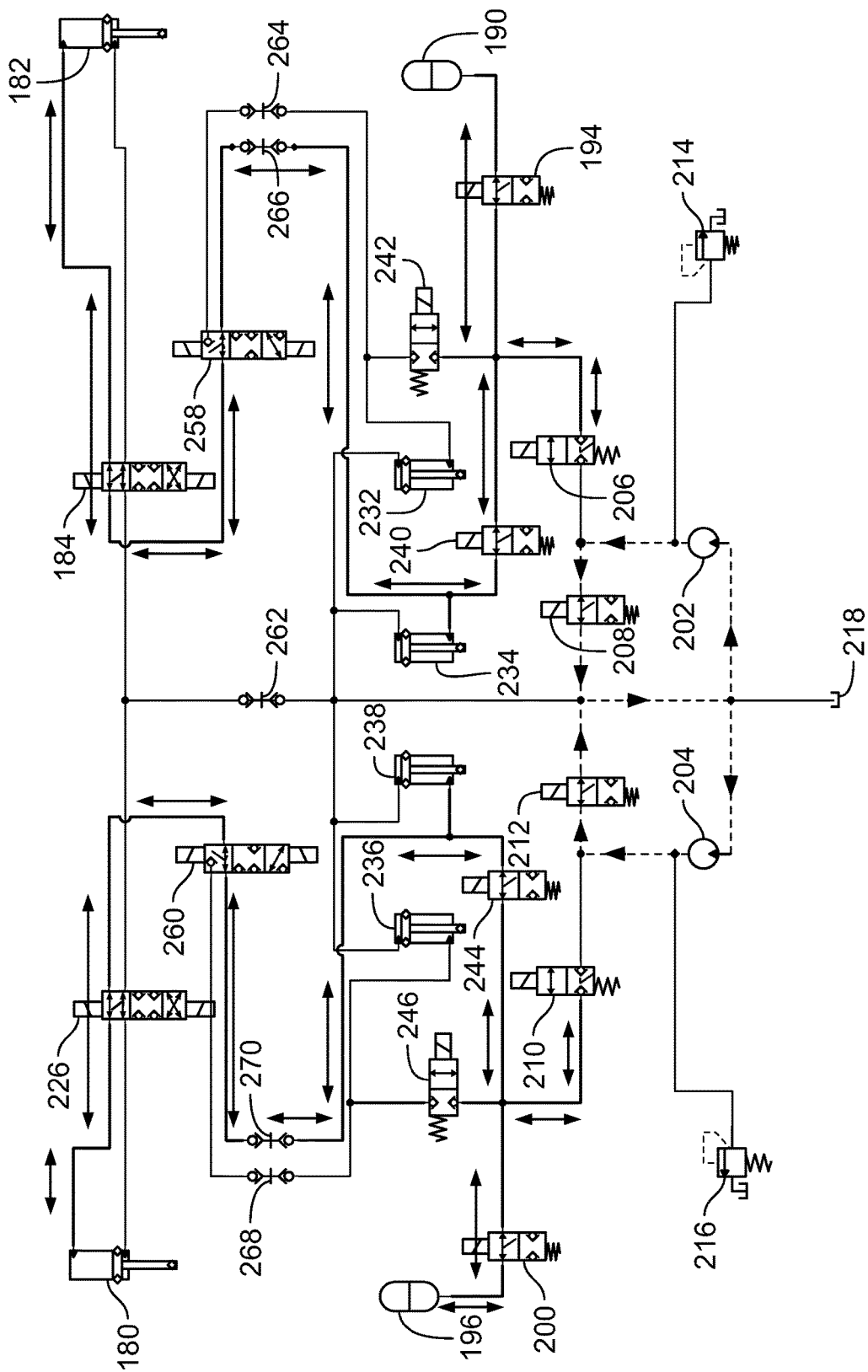
FIG. 16 is the hydraulic circuit of FIG. 15 in a mowing or field operation mode with active floatation.

FIG. 16 is the hydraulic circuit 256 of FIG. 15 in a mowing or field operation mode with active floatation. In this configuration, the accumulators 190, 196 provide floatation pressure to the floatation cylinders 234, 238 and the header is lowered to the ground or to a mowing height. The lift/float selector valves 258, 260 are shifted to provide floatation pressure to the gauge wheel directional valves 184, 226. The gauge wheels contact the ground and the gauge wheel cylinders 180, 182 are provided with floatation pressure from the accumulators 190, 196 through a parallel connection to the corresponding floatation cylinder 234, 238 and the state of the directional valve 184, 226.

Figure 17:
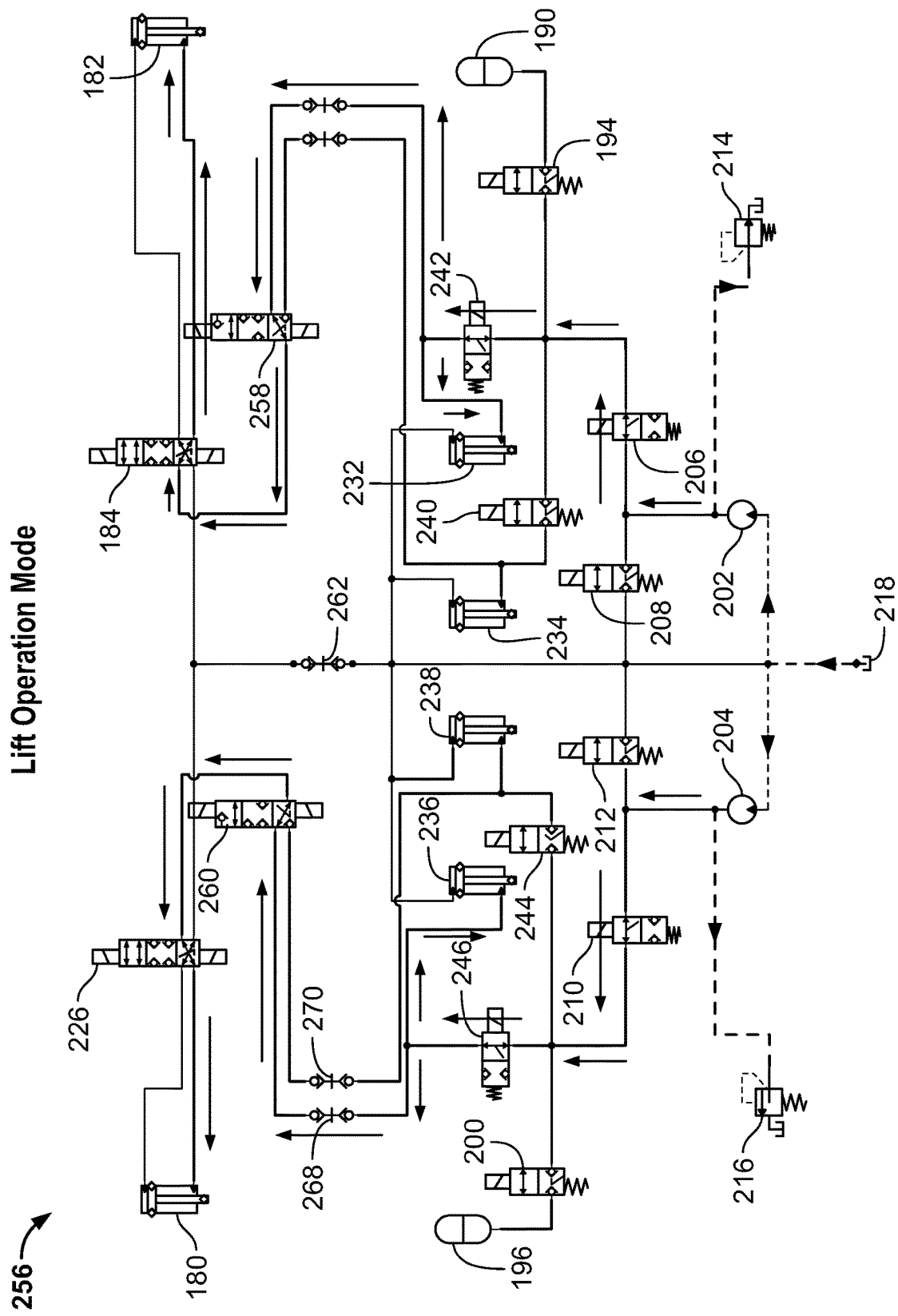
FIG. 17 is the hydraulic circuit of FIG. 15 in a lift operation mode.

FIG. 17 is the hydraulic circuit 256 of FIG. 15 in a lift operation mode. In this configuration, the accumulators 190, 196 are blocked from pump pressure and the lift cylinders 232, 236 are retracted to lift the header (or extended, depending on the design of the system). The lift/float selector valves 258, 260 are shifted to provide lift pressure to the gauge wheel directional valves 184, 226. The gauge wheel directional valves 184, 226 are shifted to provide lift pressure flow to lift the gauge wheels during the header lift operation.

Figure 18:
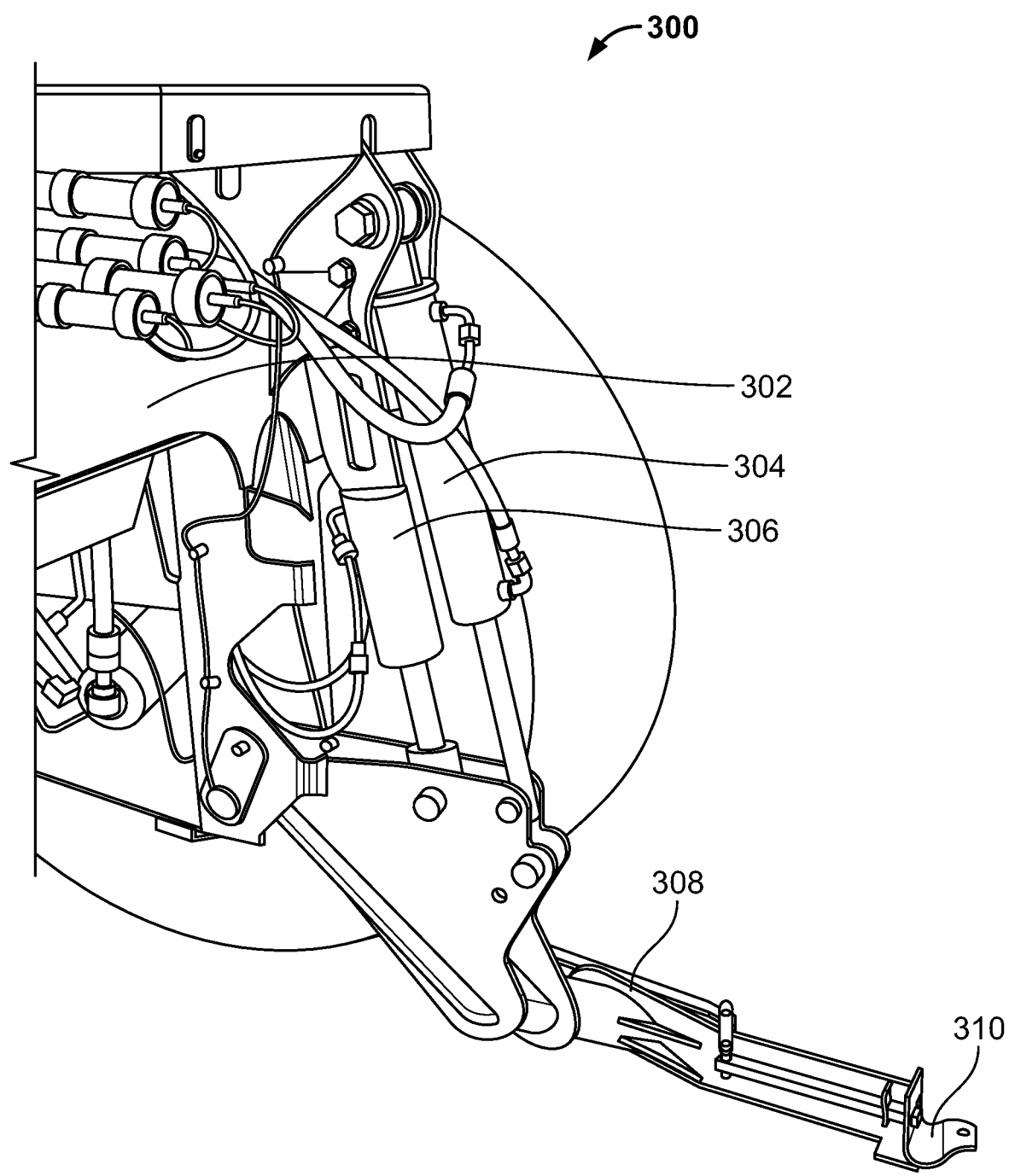
FIG. 18 is a perspective view of an exemplary harvester of the present disclosure including independent lift and float cylinders.

FIG. 18 shows an exemplary harvester 300 (e.g., a windrower) of the present disclosure including independent lift and float cylinders. Particularly, FIG. 18 shows a main frame 302 of the harvester 300, a left-hand side floatation cylinder 304, a left-hand side lift cylinder 306, a left-hand side lift arm 308, and a left-hand side lift cup 310. It should be understood that a substantially similar structure can be disposed on the right-hand side of the harvester 300.

Figure 19:
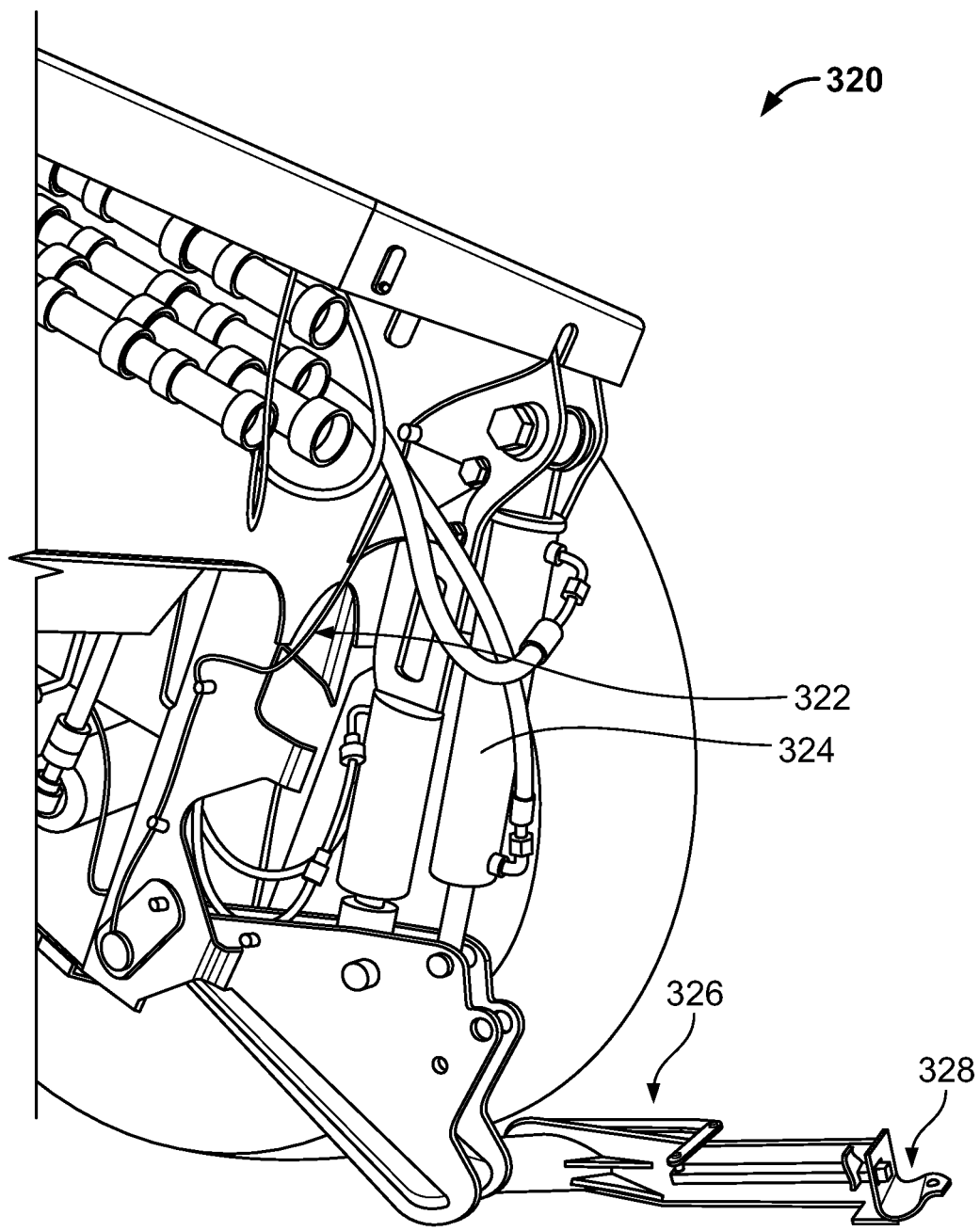
FIG. 19 is a perspective view of an exemplary harvester of the present disclosure including combined lift and float cylinders.

FIG. 19 shows an exemplary harvester 320 of the present disclosure including combined lift and float cylinders. Particularly, FIG. 19 shows a main frame 322 of the harvester 320, a left-hand side lift/float cylinder 324, a left-hand side lift arm 326, and a left-hand side lift cup 328. It should be understood that a substantially similar structure can be disposed on the right-hand side of the harvester 320.

In some embodiments, the gauge wheels of the harvester 100 can be hydraulically controlled using charge pressure for floatation. Particularly, traditional coil springs used on draper header gauge wheels can be replaced with hydraulic cylinders pressurized by the base unit charge system. To effectively operate with automatic header height control (AHHC), some means of ground gauging should be provided to dampen the natural oscillations which result from height adjustments of the header. Such oscillation is both that caused by deflections of the header frame and the resultant rocking of the tractor, tire squish, axle droop, and the like.

Traditional harvesters use coil springs coupled to the trailing arm onto which the gauge wheel is mounted. While this can provide damping, the travel of the coil spring system is limited to providing a maximum of 8 inches of travel. For differing cut height requirements, the coil spring system generally has an array of holes into which a pin is inserted manually by the operator. For an AHHC system that functions over an 18 inch range, the hydraulic system should be introduced which can apply a comparable springing force to the current coil springs, while operating over the entire range of the AHHC system.

To provide such springing force, traditional coil springs can be replaced by double action hydraulic cylinders that are pressurized by the charge pressure. The gauge wheel cylinders can be mounted in such a way that extension of the cylinders lowers the gauge wheels, having an effect of floating the head. A selector valve supplies either charge pressure or return to tank to both the barrel end and rod end of the cylinder. During operation of AHHC active, the valve is positioned to constantly supply charge pressure to the barrel end of the cylinder, while the rod end of the cylinder is open to tank. In such configuration, the windrower charge acts as an accumulator. In some embodiments, the cylinders can be mounted such that retraction of the cylinder (rather than extension) lowers the gauge wheels. In some embodiments, a dedicated pump only providing pressure for the gauge wheel system can be used in place of the charge system.

The cylinder is sized such that extension force of the cylinder under charge pressure is less than the force which would be needed to lift the head, thereby providing only a floatation or damping effect. This floatation effect allows the header to be raised, lowered, and tilted literally by the AHHC system without needing adjustments to the gauge wheel cylinders. The valve configuration provides the ability for the rod end to be pressurized by the charge pressure during the raising function, which lifts the gauge wheels for clearance while traversing windrows or provide storage position for transport. An off position can be provided, allowing the system to be decoupled from the tractor for header removal. The cylinders can be plumbed in parallel to allow independent movement.

If the charge pressure of the tractor is substantially constant (e.g., approximately 500 psi) at wide open throttle, the bore diameter of the gauge wheel cylinders can be specific to header weight. A lighter header will result in smaller bore cylinders, and a heavier header results in larger bore cylinders. Thus, no additional logic is needed for the control system to operate AHHC with hydraulically sprung gauge wheels, resulting in substantially passive springs. The use of cylinders provides a constant spring force, as opposed to the force provided by the coil springs, which increases with deflection. Such control system allows for adjustment of the gauge wheels without necessitating that the operator exit the cab to make manual adjustments for differing crop heights, saving time and relieving the operator from having to lift the heavy gauge wheels.

Figure 20:
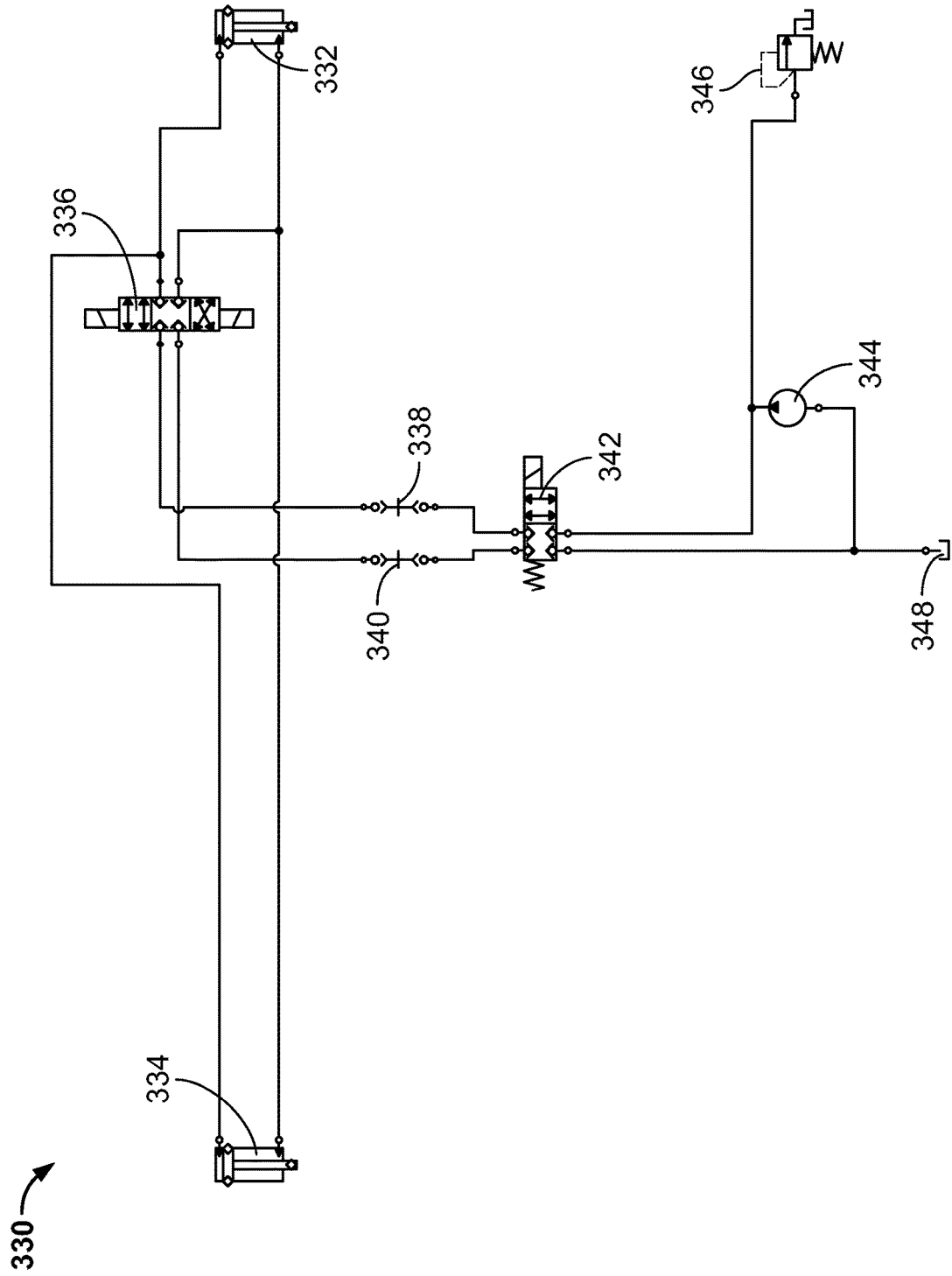
FIG. 20 is a static image of hydraulic circuit for an exemplary harvester header of the present disclosure including hydraulically controlled gauge wheels using base unit charge pressure for floatation.

FIG. 20 is a diagrammatic view of an exemplary hydraulic system 330 for actuation of the left and right-hand side hydraulic cylinders 332, 334. The hydraulic system 330 includes a gauge wheel directional valve 336, couplers 338, 340, a charge to header selector valve 342, a charge pump 344, charge pump relief valve 346, and a reservoir or tank 348. The hydraulic system 330 can be used to provide a floatation force to the gauge wheel cylinders 332, 334 and pressure to lift the gauge wheels during header lift operations. The components above the couplers 338, 340 can be located on the header, and any components below the couplers 338, 340 can be located on the base unit (e.g., a windrower or harvester). For clarity, pumps, motors, and the like, that the charge system is used to flush are not shown.

Figure 21:
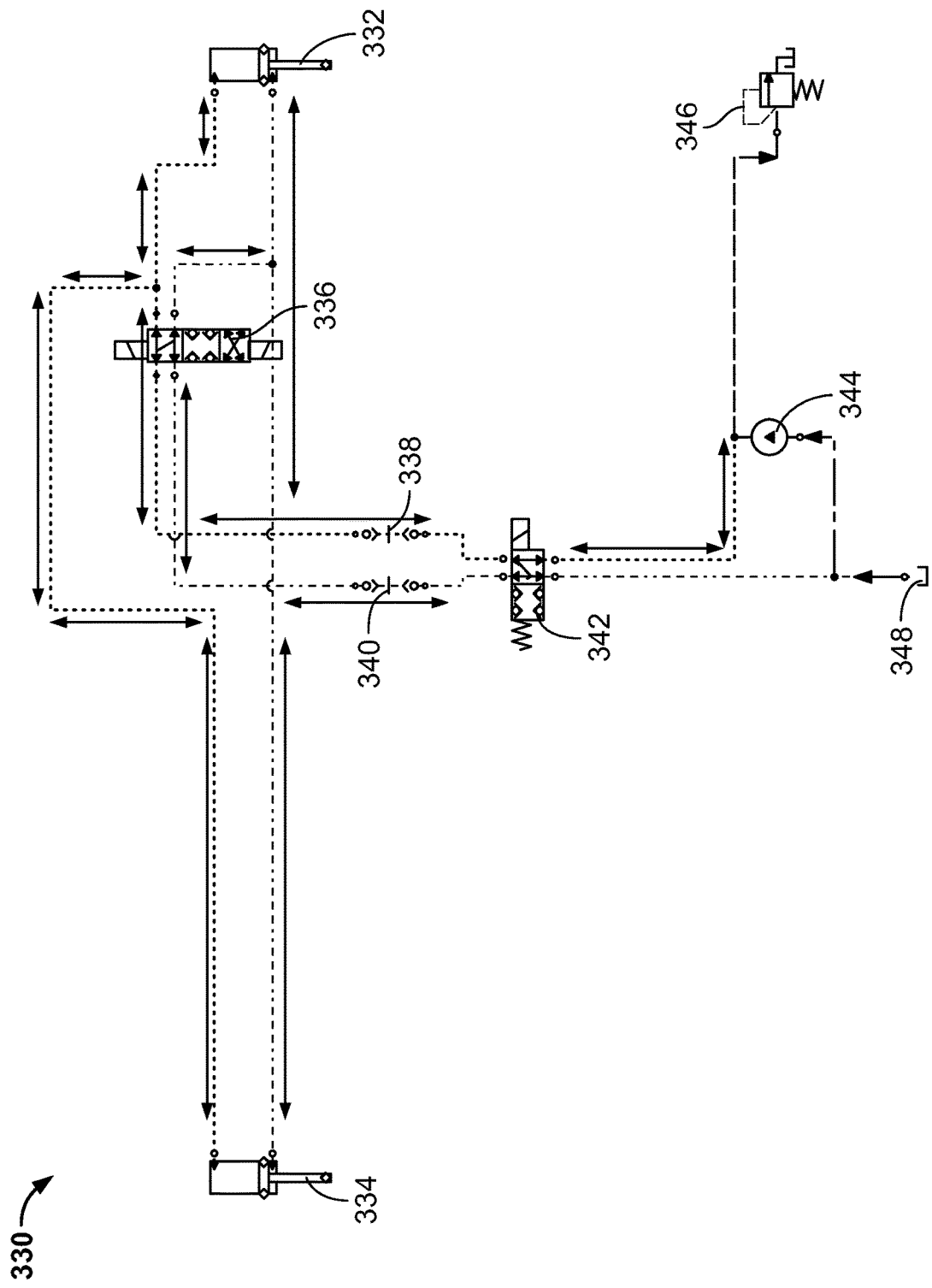
FIG. 21 is the hydraulic circuit of FIG. 20 in a field operation mode.

FIG. 21 is a diagrammatic view of the hydraulic system 330 of FIG. 20 in a field operation mode. Particularly, the hydraulic system 330 uses charge pressure to provide floatation pressure and, thereby, a spring force to the gauge wheel cylinders 332, 334 during a harvesting or mowing operation. During harvesting operation, the header is lowered to cutting height by the base unit lift system (not shown), and the gauge wheels are open to charge pressure on their barrel end. During this operation, the gauge wheels follow the contour of the ground providing a downward force equal to the charge pressure relief, divided by the area of the barrel end of the piston in the gauge wheel cylinder, multiplied by the effective moment arm of the wheel arm. Such determination can be a constant value based on the header geometry, gauge wheel cylinder bore, gauge wheel arm length, gauge wheel cylinder mounting configuration, gauge wheel geometry, and the like.

Figure 22:
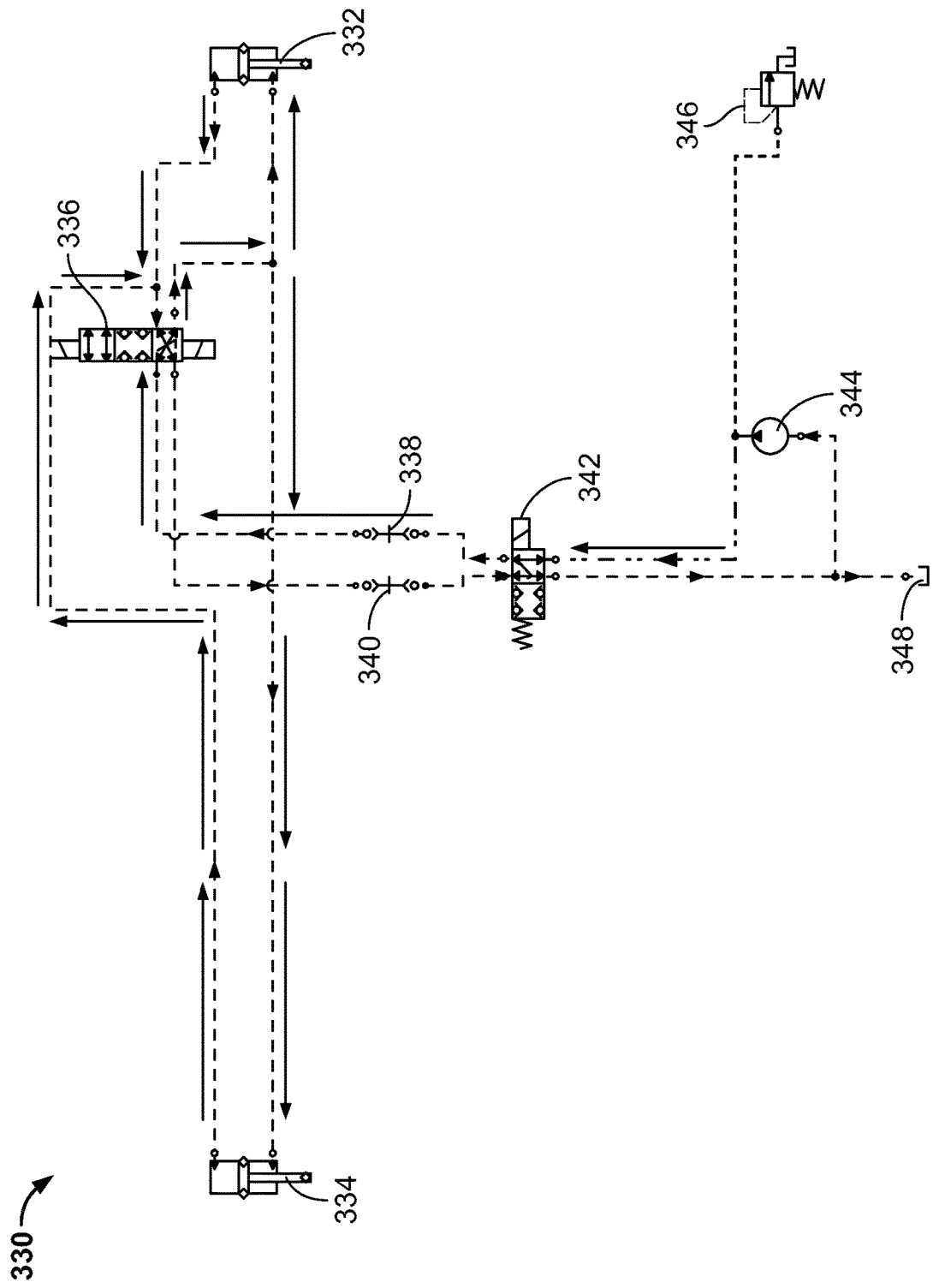
FIG. 22 is the hydraulic circuit of FIG. 20 in a lift operation mode.

FIG. 22 is a diagrammatic view of the hydraulic system 330 of FIG. 20 in a lift operation mode. Particularly, the hydraulic system 330 uses the charge pressure to provide a lifting force to the gauge wheels of a draper header. During a header lift operation, the gauge wheel directional valve 336 is shifted to lift the gauge wheels by pressurizing the rod end of the gauge wheel cylinders 332, 334, retracting the cylinders 332, 334 and lifting the gauge wheels up to a stowed position.

Figure 23:
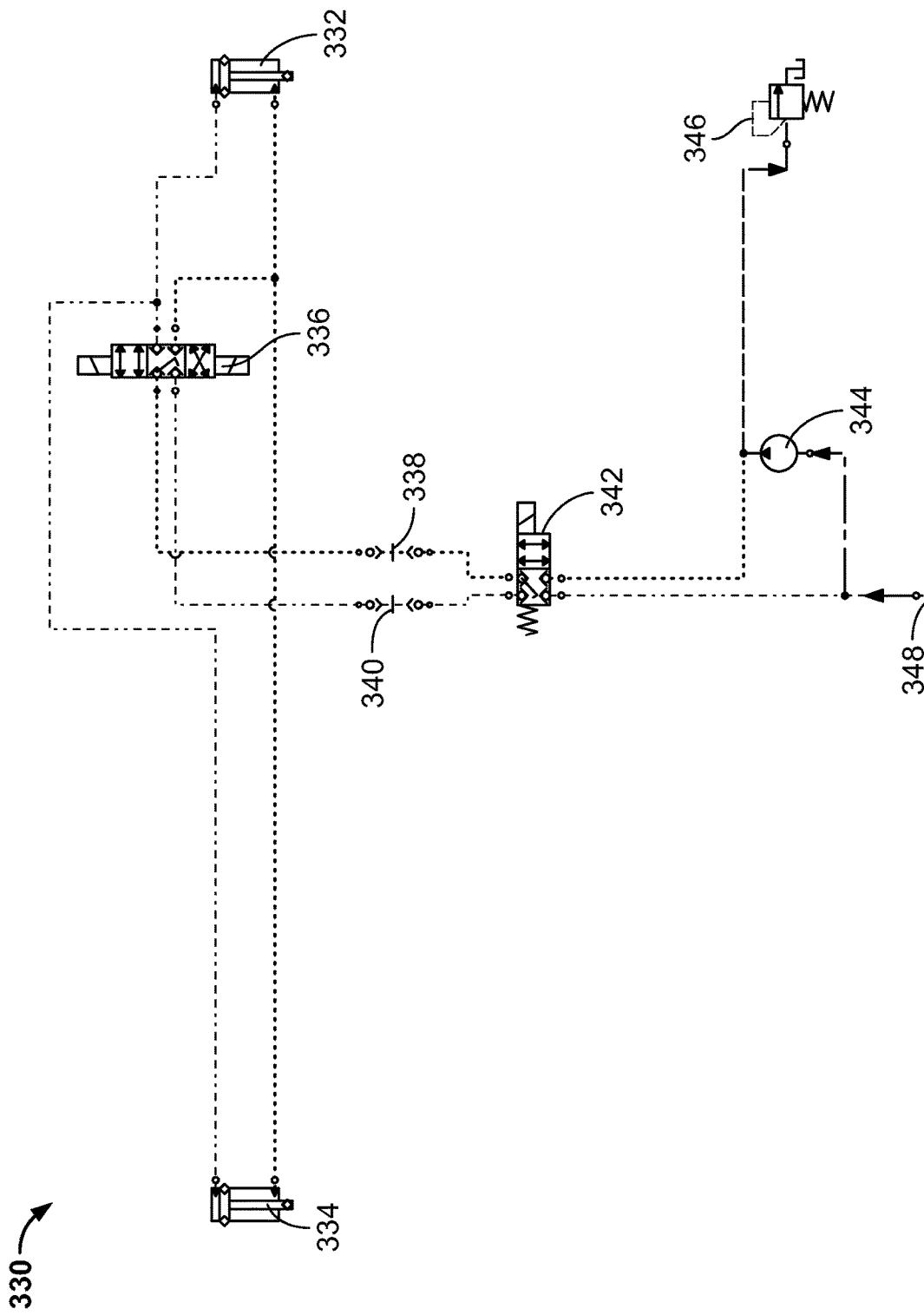
FIG. 23 is the hydraulic circuit of FIG. 20 in a stowed operation mode.

FIG. 23 is a diagrammatic view of the hydraulic system 330 of FIG. 20 in a stowed operation mode. Particularly, the hydraulic system 330 uses the charge pressure to provide a floatation force to gauge wheels on a draper header in a stowed position. A header lift operation is completed by the windrower or harvester, and the gauge wheels are positioned in a fully lifted position. Both the gauge wheel directional valve 336 and charge to the header selector valve 342 are closed to lock the gauge wheels in the stowed position.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A draper header for a harvester, the draper header comprising:
a chassis;
first and second wheel supports pivotally coupled to the chassis;
a first ground wheel rotatably coupled to the first wheel support;
a second ground wheel rotatably coupled to the second wheel support;
a first hydraulic cylinder pivotally coupled between the first wheel support and the chassis;
a second hydraulic cylinder pivotally coupled between the second wheel support and the chassis;
a hydraulic system fluidly coupled with the first and second hydraulic cylinders,
wherein in a lowered operation mode, hydraulic fluid flows from the hydraulic system into at least one of first and second hydraulic cylinders to extend the first and second hydraulic cylinders to lower the first and second ground wheels relative to the chassis,
wherein in a raised operation mode, the hydraulic fluid is released from at least one of the first and second hydraulic cylinders to the hydraulic system to retract the first and second hydraulic cylinders to raise the first and second ground wheels relative to the chassis, and
wherein in the lowered operation mode, the hydraulic fluid from the hydraulic system provides floatation pressure from lift cylinders associated with the harvester.

2. The draper header of claim 1, wherein the first and second hydraulic cylinders are independently actuated to independently regulate lowering and raising of the first and second ground wheels.

3. The draper header of claim 1, wherein in the lowered operation mode and the raised operation mode, extending or retracting the first and second hydraulic cylinders rotates the first and second wheel supports relative to the chassis.

4. The draper header of claim 1, wherein the floatation pressure provides a springing or dampening force to the first and second ground wheels.

5. The draper header of claim 1, further comprising a right-hand side combined lift/float hydraulic cylinder and a left-hand side combined lift/float hydraulic cylinder fluidically connected to the first and second hydraulic cylinders.

6. The draper header of claim 1, further comprising a right-hand side lift hydraulic cylinder, a right-hand side float hydraulic cylinder, a left-hand side lift hydraulic cylinder, and a left-hand side float hydraulic cylinder fluidically connected to the first and second hydraulic cylinders.

7. A harvester, comprising:
a frame;
a hydraulic fluid system;
a draper header;
first and second lift/float cylinders operably coupled to the frame and configured to selectively lift and lower the draper header relative to the frame,
wherein the draper head comprises:
a chassis;
first and second wheel supports pivotally coupled to the chassis;
a first ground wheel rotatably coupled to the first wheel support;
a second ground wheel rotatably coupled to the second wheel support;
a first hydraulic cylinder fluidly coupled to the hydraulic fluid system and pivotally coupled between the first wheel support and the chassis; and
a second hydraulic cylinder fluidly coupled to the hydraulic fluid system and pivotally coupled between the second wheel support and the chassis,
wherein in a lowered operation mode, hydraulic fluid is allowed to flow from the hydraulic fluid system into at least one of first and second hydraulic cylinders to extend the first and second hydraulic cylinders to lower the first and second ground wheels relative to the chassis,
wherein in a raised operation mode, the hydraulic fluid is released from at least one of the first and second hydraulic cylinders to retract the first and second hydraulic cylinders to raise the first and second ground wheels relative to the chassis, and
wherein in the lowered operation mode, the hydraulic fluid from the hydraulic fluid system provides floatation pressure from respective ones of the first and second lift cylinders.

8. The harvester of claim 7, wherein each of the first and second lift/float cylinders comprises a combined lift/float hydraulic cylinder.

9. The harvester of claim 7, wherein each of the first and second lift/float cylinders comprises a lift hydraulic cylinder separate from a float hydraulic cylinder.

10. The harvester of claim 7, wherein the first and second hydraulic cylinders are independently actuated to independently regulate lowering and raising of the first and second ground wheels.

11. The harvester of claim 7, wherein in the lowered operation mode and the raised operation mode, extending or retracting the first and second hydraulic cylinders rotates the first and second wheel supports relative to the chassis.

12. A draper header for a harvester, comprising:
a chassis;
first and second wheel supports pivotally coupled to the chassis;
a first ground wheel rotatably coupled to the first wheel support;
a second ground wheel rotatably coupled to the second wheel support;
a first double-acting hydraulic cylinder pivotally coupled between the first wheel support and the chassis;
a second double-acting hydraulic cylinder pivotally coupled between the second wheel support and the chassis; and
a hydraulic system fluidly coupled with the first and second hydraulic cylinders,
wherein the first and second hydraulic cylinders are fluidically coupled to a charge pressure of the hydraulic system, the charge pressure providing a floatation pressure to position the first and second ground wheels at a lowered operation mode and a raised operation mode.

13. The draper header of claim 12, wherein in the lowered operation mode, hydraulic fluid is allowed to flow into at least one of first and second hydraulic cylinders from the hydraulic system to extend the first and second hydraulic cylinders to lower the first and second ground wheels relative to the chassis.

14. The draper header of claim 12, wherein in the raised operation mode, the hydraulic fluid is released from at least one of the first and second hydraulic cylinders to the hydraulic system retract the first and second hydraulic cylinders to raise the first and second ground wheels relative to the chassis.

15. The draper header of claim 12, wherein the first and second hydraulic cylinders are independently actuated to independently regulate lowering and raising of the first and second ground wheels.

16. The draper header of claim 12, comprising a selector valve fluidically coupled to the first and second hydraulic cylinders and configured to provide the charge pressure to the first and second hydraulic cylinders.

17. The draper header of claim 16, comprising a directional valve fluidically coupled to the selector valve.

18. A harvester, comprising:
a frame;
first and second lift/float cylinders operably coupled to the frame and configured to selectively lift and lower a draper header relative to the frame; and
the draper header, comprising:
a chassis;
first and second wheel supports pivotally coupled to the chassis;
a first ground wheel rotatably coupled to the first wheel support;
a second ground wheel rotatably coupled to the second wheel support;
a first double-acting hydraulic cylinder pivotally coupled between the first wheel support and the chassis; and
a second double-acting hydraulic cylinder pivotally coupled between the second wheel support and the chassis; and
a hydraulic system fluidly coupled with the first and second hydraulic cylinders,
wherein the first and second hydraulic cylinders are fluidically coupled to a charge pressure of the hydraulic system, the charge pressure providing a floatation pressure to position the first and second ground wheels at a lowered operation mode and a raised operation mode.

* * * * *